US012107658B2

(12) United States Patent
Lee et al.

(10) Patent No.: US 12,107,658 B2
(45) Date of Patent: Oct. 1, 2024

(54) ELECTRONIC DEVICE INCLUDING PLURAL ANTENNAS, AND OPERATION METHOD THEREOF

(71) Applicant: Samsung Electronics Co., Ltd., Gyeonggi-do (KR)

(72) Inventors: Woosup Lee, Gyeonggi-do (KR); Youngsuk Yoo, Gyeonggi-do (KR); Sukgi Hong, Gyeonggi-do (KR); Moonseok Kang, Gyeonggi-do (KR); Yi Yang, Gyeonggi-do (KR); Kunyoung Choi, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 362 days.

(21) Appl. No.: 17/554,193

(22) Filed: Dec. 17, 2021

(65) Prior Publication Data

US 2022/0173790 A1    Jun. 2, 2022

Related U.S. Application Data

(63) Continuation of application No. PCT/KR2021/017607, filed on Nov. 26, 2021.

(30) Foreign Application Priority Data

Nov. 26, 2020 (KR) .................. 10-2020-0161552

(51) Int. Cl.
*H04B 7/08*     (2006.01)
*G01S 5/04*     (2006.01)
*H01Q 9/04*     (2006.01)
*H01Q 21/06*    (2006.01)
*H01Q 1/24*     (2006.01)

(52) U.S. Cl.
CPC ................ *H04B 7/08* (2013.01); *G01S 5/04* (2013.01); *H01Q 9/0407* (2013.01); *H01Q 21/06* (2013.01); *H01Q 1/243* (2013.01)

(58) Field of Classification Search
CPC .......... H04B 7/08; G01S 5/04; H01Q 9/0407; H01Q 21/06
USPC ........................................................ 342/465
See application file for complete search history.

(56) References Cited

U.S. PATENT DOCUMENTS

| 6,985,123 B2 | 1/2006 | Gottl |
| 8,362,954 B2 | 1/2013 | Nogami |
| 2017/0059685 A1 | 3/2017 | Moghaddasi et al. |
| 2017/0222315 A1 | 8/2017 | Hozouri |

(Continued)

FOREIGN PATENT DOCUMENTS

| JP | 2008-139255 | 6/2008 |
| JP | WO 2009/107601 | 6/2011 |

(Continued)

OTHER PUBLICATIONS

International Search Report dated Feb. 25, 2022 issued in counterpart application No. PCT/KR2021/017607, 13 pages.

*Primary Examiner* — Harry K Liu
(74) *Attorney, Agent, or Firm* — The Farrell Law Firm, P.C.

(57) ABSTRACT

Disclosed is an electronic device including a plurality of antennas, and a control circuit configured to identify a two-dimensional coordinate value using signals received through the plurality of antennas and correct a signal reception angle based on the two-dimensional coordinate value, or to selectively filter data received from a signal source.

14 Claims, 20 Drawing Sheets

(56) References Cited

U.S. PATENT DOCUMENTS

| | | | |
|---|---|---|---|
| 2019/0064312 A1 | 2/2019 | Jeon et al. | |
| 2019/0097317 A1 | 3/2019 | Di Nallo et al. | |
| 2019/0129026 A1* | 5/2019 | Sumi | G01S 7/52038 |
| 2020/0021011 A1 | 1/2020 | Cooper et al. | |
| 2020/0178054 A1 | 6/2020 | Similaysky | |
| 2021/0024873 A1 | 1/2021 | Yu et al. | |
| 2021/0066799 A1* | 3/2021 | Avser | H01Q 5/25 |
| 2021/0313682 A1 | 10/2021 | Park | |
| 2023/0118019 A1 | 4/2023 | Seol et al. | |
| 2023/0178901 A1 | 6/2023 | Kim et al. | |

FOREIGN PATENT DOCUMENTS

| | | | |
|---|---|---|---|
| JP | 2012-182706 | 9/2012 | |
| KR | 1020200022266 | 3/2020 | |
| KR | 1020210158199 | 12/2021 | |
| KR | 1020220017131 | 2/2022 | |
| KR | 1020220022606 | 2/2022 | |
| KR | 1020220065630 | 5/2022 | |
| WO | WO 2019/191133 | 10/2019 | |
| WO | WO-2021058479 A1 * | 4/2021 | G06K 7/10356 |

* cited by examiner

ELECTRONIC DEVICE INCLUDING PLURAL ANTENNAS, AND OPERATION METHOD THEREOF

CROSS-REFERENCE TO RELATED APPLICATION(S)

This application is a Bypass Continuation Application of International Application No. PCT/KR2021/017607, which was filed on Nov. 26, 2021, and is based on and claims priority under 35 U.S.C. § 119 to Korean Patent Application No. 10-2020-0161552, which was filed in the Korean Intellectual Property Office on Nov. 26, 2020, the entire disclosure of each of which is incorporated herein by reference.

BACKGROUND

1. Field

The disclosure relates generally to an electronic device, and more particularly, to an electronic device including a plurality of antennas and a method of operating the same.

2. Description of Related Art

Recently, an ultra wide band (UWB) has been realized as a form of new communication technology. The UWB complies with the international standard of institute of electrical and electronics engineers (IEEE) 802.15.4 and can communicate with a broadband bandwidth. The UWB is optimized as a type of location determination technology using a broadband bandwidth rather than increasing a communication speed and transmission speed by using a broadband in existing communications. For example, UWB utilizes an angle of arrival (AOA) based location determination method.

The location determination method may identify a signal reception angle using a phase difference between signals received by two antennas. The signal reception angle indicates an angle with respect to a configured axis of an electronic device and may be used for estimating a position of a signal source. However, a recognition error of the signal reception angle may occur when the two antennas are misaligned in a direction of the configured axis. Further, when the electronic device is tilted, a signal quality of data communication or service with a signal source based on location determination may be deteriorated.

As such, there is a need in the art for an electronic device that prevents such dual antenna misalignment and service deterioration from occurring.

SUMMARY

The disclosure has been made to address at least the above-mentioned problems and/or disadvantages and to provide at least the advantages described below.

Accordingly, an aspect of the disclosure is to provide an electronic device including a plurality of antennas and a method of operating the same for reducing a recognition error of a signal reception angle.

Another aspect of the disclosure is to provide an electronic device including a plurality of antennas which can secure a signal quality of data communication or service with a signal source based on location determination, thereby securing reliability of the electronic device.

In accordance with an aspect of the disclosure, an electronic device includes a plurality of antennas, and a control circuit configured to identify a two-dimensional coordinate value using signals received through the plurality of antennas and correct a signal reception angle based on the two-dimensional coordinate value, or to selectively filter data received from a signal source.

In accordance with another aspect of the disclosure, an electronic device includes a first antenna and second antenna aligned in an x-axis direction, a third antenna misaligned with the first antenna in a y-axis direction, and a control circuit, wherein the control circuit is configured to identify a first signal reception angle using signals received through the first antenna and the second antenna, identify a second signal reception angle using signals received through the first antenna and the third antenna, and correct the second signal reception angle using a misalignment distance of the first antenna and the third antenna, and the first signal reception angle.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Figure 1:
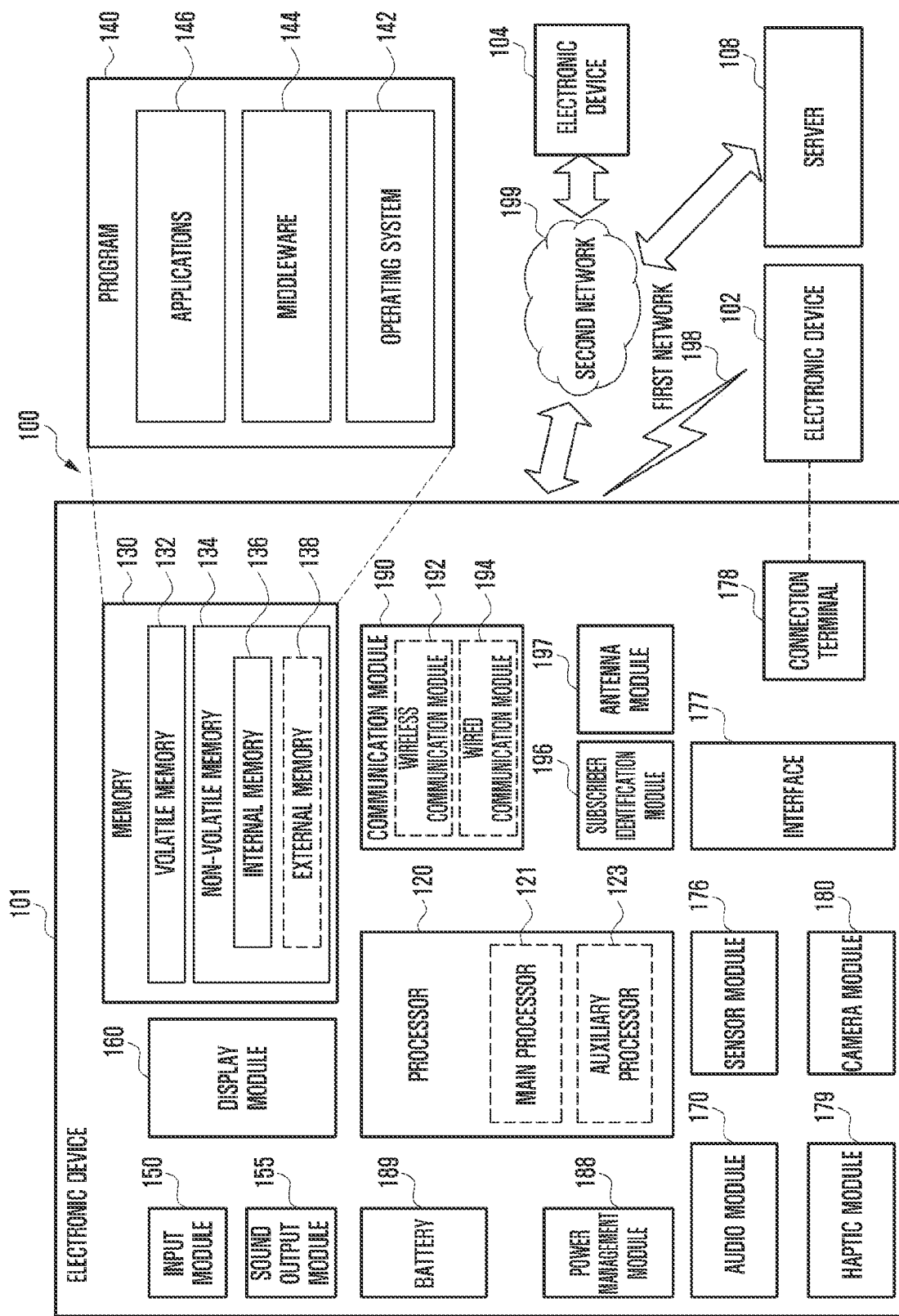
FIG. 1 illustrates an electronic device in a network environment, according to an embodiment.

Hereinafter, various embodiments of this document will be described with reference to the accompanying drawings. In the disclosure, embodiments are described in the drawings and a related detailed description is set forth, but this is not intended to limit the embodiments of the disclosure. Descriptions of well-known functions and constructions are omitted for the sake of clarity and conciseness.

FIG. 1 illustrates an electronic device 101 in a network environment 100 according to an embodiment.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). The electronic device 101 may communicate with the electronic device 104 via the server 108. The electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, and/or an antenna module 197. In some embodiments of the disclosure, at least one (e.g., the connection terminal 178) of the components may be omitted from the electronic device 101, or one or more other components may be added in the electronic device 101. In some embodiments of the disclosure, some of the components may be implemented as single integrated circuitry. For example, the sensor module 176, the camera module 180, or the antenna module 197 may be implemented as embedded in single component (e.g., the display module 160).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123. According to an embodiment of the disclosure, the auxiliary processor 123 (e.g., a neural network processing device) may include a hardware structure specified for processing an artificial intelligence model. The artificial intelligence model may be created through machine learning. Such learning may be performed, for example, in the electronic device 101 itself on which the artificial intelligence model is performed, or may be performed through a separate server (e.g., the server 108). The learning algorithms may include, for example, supervised learning, unsupervised learning, semi-supervised learning, or reinforcement learning, but is not limited thereto. The artificial intelligence model may include a plurality of artificial neural network layers. The artificial neural network may any of be a deep neural network (DNN), a convolutional neural network (CNN), a recurrent neural network (RNN), a restricted Boltzmann machine (RBM), a deep belief network (DBN), a bidirectional recurrent DNN (BRDNN), a deep Q-network or a combination of two or more of the above-mentioned networks, but is not limited to the above-mentioned examples. In addition to the hardware structure, the artificial intelligence model may, additionally or alternatively, include a software structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 and/or the non-volatile memory 134.

The program 140 may be stored in the memory 130 as software, and may include, for example, an operating system (OS) 142, middleware 144, and/or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record, and the receiver may be used for incoming calls. The receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. The display module 160 may include touch circuitry (e.g., a touch sensor) adapted to detect a touch, or sensory circuitry (e.g., a pressure sensor) adapted to measure the intensity of force incurred by the touch.

The audio module 170 may convert a sound into an electrical signal and vice versa. The audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high-definition multimedia interface (HDMI), a universal serial bus (USB) interface, a secure digital (SD) card interface, and/or an audio interface.

The connecting terminal 178 may include a connector via which the electronic device 101 may be physically connected with the external electronic device (e.g., the electronic device 102). The connecting terminal 178 may include, for example, an HDMI connector, a USB connector, an SD card connector, and/or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, ISPs, or flashes.

The power management module 188 may manage power supplied to or consumed by the electronic device 101. According to one embodiment, the power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, and/or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as BLUETOOTH, wireless-fidelity (Wi-Fi) direct, or IR data association (IrDA)) or the second network 199 (e.g., a long-range communication network, such as a legacy cellular network, a $5^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a $4^{th}$ generation (4G) network, and next-generation communication technology, e.g., new radio (NR) access technology. The NR access technology may support high-speed transmission of high-capacity data (i.g., enhanced mobile broadband (eMBB)), minimization of terminal power and connection of multiple terminals (massive machine type communications (mMTC)), or high reliability and low latency (ultra-reliable and low-latency communications (URLLC)). The wireless communication module 192 may support a high-frequency band (e.g., a mmWave band) to achieve, for example, a high data transmission rate. The wireless communication module 192 may support various technologies for securing performance in a high-frequency band, such as beamforming, massive multiple-input and multiple-output (MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment of the disclosure, the wireless communication module 192 may support a peak data rate for implementing eMBB (e.g., 20 Gbps or more), loss coverage for implementing mMTC (e.g., 164 dB or less), or U-plane latency for realizing URLLC (e.g., 0.5 ms or less for each of downlink (DL) and uplink (UL), or 1 ms or less for round trip).

The antenna module 197 may transmit or receive a signal or power to or from the outside (e.g., the external electronic device) of the electronic device 101. The antenna module 197 may include an antenna including a radiating element including a conductive material or a conductive pattern formed in or on a substrate (e.g., a printed circuit board (PCB)). The antenna module 197 may include a plurality of antennas (e.g., an antenna array). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the closure, the mmWave antenna module may include a PCB, an RFIC that is disposed on or adjacent to a first surface (e.g., the bottom surface) of the PCB and is capable of supporting a predetermined high-frequency band (e.g., a mmWave band), and a plurality of antennas (e.g., array antennas) that is disposed on or adjacent to a second surface (e.g., the top surface or the side surface) of the PCB, or adjacent to the second surface and is capable of transmitting or receiving a signal of the predetermined high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 or 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may an ultra-low delay service using, for example, distributed computing or MEC. In another embodiment of the disclosure, the external electronic device 104 may include an internet-of-things (IoT) device. The server 108 may be an intelligent server using machine learning and/or neural networks. According to an embodiment of the disclosure, the external electronic device 104 or the server 108 may be included in the second network 199. The electronic device 101 may be applied to an intelligent service (e.g., smart home, smart city, smart car, or healthcare) based on 5G communication technology or IoT-related technology.

An electronic device according to an embodiment of the disclosure may be one of various types of electronic devices. The electronic devices may include a portable communication device (e.g., a smartphone), a computer device, a portable multimedia device, a portable medical device, a camera, a wearable device, or a home appliance. However, the electronic device is not limited to any of those described above.

Various embodiments of the disclosure and the terms used herein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1$^{st}$" and "2nd," or "first" and "second" may be used to simply distinguish a corresponding component from another, and does not limit the components in other aspect (e.g., importance or order). If an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

The term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAY-STORE™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
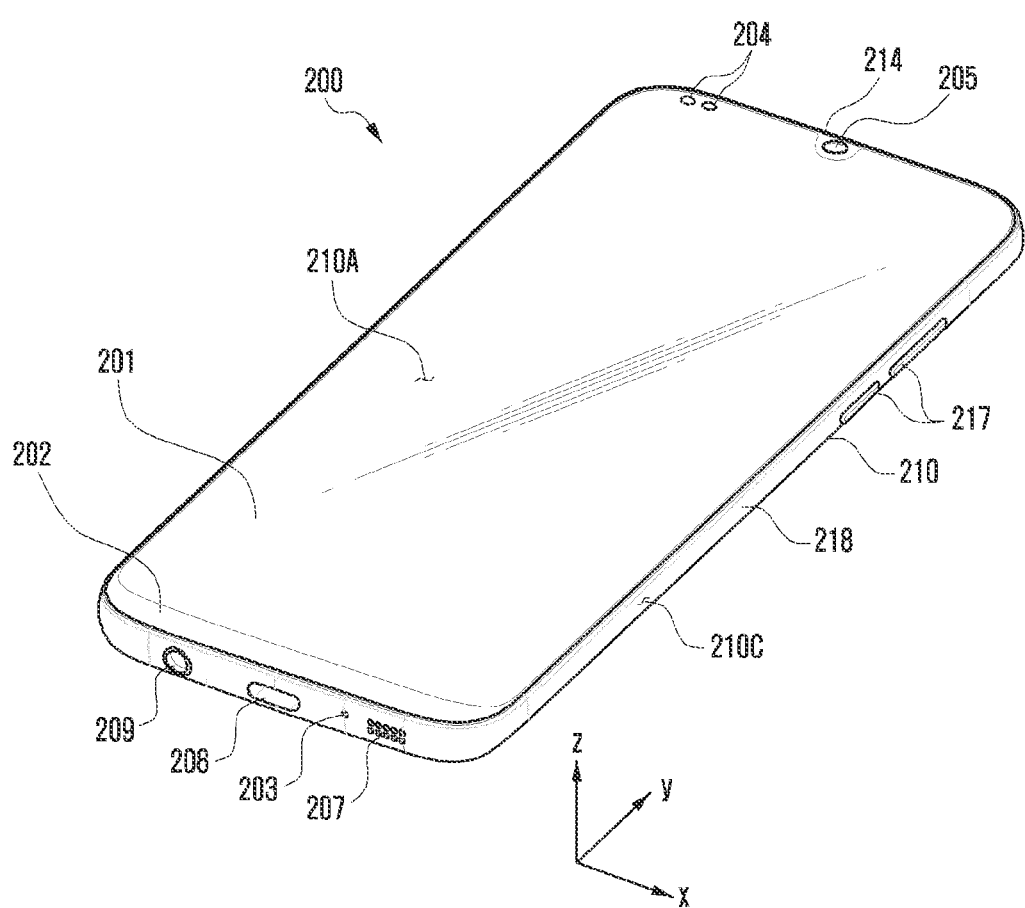
FIG. 2 illustrates a front surface of a mobile electronic device, according to an embodiment.
Figure 3:
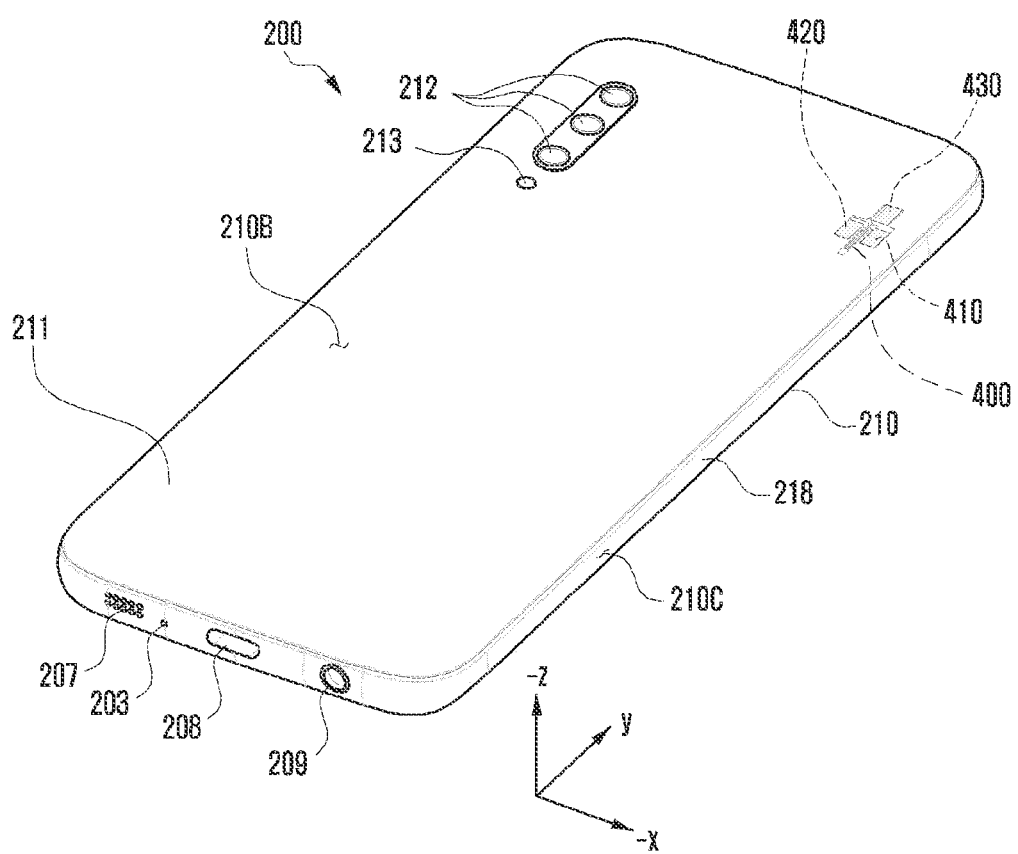
FIG. 3 illustrates a rear surface of the electronic device of FIG. 2, according to an embodiment.

FIG. 2 illustrates a front surface of a mobile electronic device 200, according to an embodiment. FIG. 3 illustrates a rear surface of the electronic device 200 of FIG. 2, according to an embodiment.

Referring to FIGS. 2 and 3, the electronic device 200 may include a housing 210 including a first surface (or front surface) 210A, a second surface (or rear surface) 210B, and a side surface 210C enclosing a space between the first surface 210A and the second surfaces 210B. The housing 210 may include a structure forming at least a portion of the first surface 210A, the second surface 210B, and the side surface 210C. The first surface 210A may be formed by a front plate (or first plate) 202 (e.g., a polymer plate or a glass plate including various coating layers) that is at least partially transparent. The second surface 210B may be formed by a substantially opaque rear plate (or second plate) 211 formed by coated or tinted glass, ceramic, polymer, metal (e.g., aluminum, stainless steel (STS), or magnesium), or a combination of at least two of these materials. The side surface 210C may be coupled to the front plate 202 and the rear plate 211 and be formed by a side bezel structure (or "side member") 218 including a metal and/or a polymer. The rear plate 211 and the side bezel structure 218 may be integrally formed and include the same metallic material such as aluminum, or a non-metallic material such as a polymer.

The electronic device 200 may include at least one of a display 201, audio modules 203, 207, and 214, a sensor module 204, camera modules 205, 212, and 213, a key input device 217, and connector holes 208 and 209. The electronic device 200 may omit at least one of the components or additionally include other components.

The display 201 may be visually exposed through the front plate 202. Corners of the display 201 may be formed to be substantially identical to an adjacent outer shape of the front plate 202. Alternatively, in order to expand an area in which the display 201 is exposed, a distance between an outer periphery of the display 201 and an outer periphery of the front plate 202 may be formed substantially the same.

A recess or opening may be formed in a portion of a screen display area of the display 201, and a portion of the screen display area of the display 201 may include at least one of the audio module 214, the sensor module 204, and the camera module 205 aligned with the recess or the opening. At least one of the audio module 214, the sensor module 204, and the camera module 205 may be included at a rear surface of the screen display area of the display 201. The display 201 may be coupled to or disposed adjacent to a touch sensing circuit, a pressure sensor capable of measuring intensity (pressure) of a touch, and/or a digitizer that detects a magnetic field type stylus pen.

The audio modules 203, 207, and 214 may include the audio module 203 including a microphone disposed within the housing 210 and a microphone hole formed in the housing 210, the audio module 207 including a first speaker disposed within the housing 210 and a first speaker hole formed in the housing 210, and the audio module 214 including a second speaker disposed within the housing 210 and a second speaker hole formed in the housing 210. The microphone hole may be formed in the side surface 210C of the housing 210. In some embodiments, a plurality of microphones may be disposed to detect a direction of a sound. The first speaker hole may be formed in the side surface 210C of the housing 210, and the first speaker may include an external speaker. The second speaker hole may be formed in the first surface 210A of the housing 210, and the second speaker may include a receiver for call. In some embodiments, at least one speaker hole and at least one microphone hole may be implemented as a single hole. In some embodiments, at least one speaker may be implemented without speaker hole (e.g., piezo speaker).

The sensor module 204 may generate an electrical signal or data value corresponding to an internal operating state of the electronic device 200 or an external environmental state. The sensor module 204 (e.g., proximity sensor, illuminance sensor) may be positioned to correspond to the first surface 210A inside the housing 210. A location of the sensor module 204 may vary without being limited to the embodiment of FIG. 2, and the sensor module 204 may include a fingerprint sensor. The electronic device 200 may further include various sensor modules (e.g., a heart rate monitor (HRM) sensor) positioned to correspond to the second surface 210B. The electronic device 200 may further include a sensor module, such as at least one of a gesture sensor, a gyro sensor, an atmospheric pressure sensor, a magnetic sensor, an acceleration sensor, a grip sensor, a color sensor, an IR sensor, a biometric sensor, a temperature sensor, or a humidity sensor.

The camera modules 205, 212, and 213 may include a first camera device 205 positioned to correspond to the first surface 210A inside the housing 210, a second camera device 212 positioned to correspond to the second surface 210B, and/or a flash 213. The first camera device and/or the second camera device may include one or a plurality of lenses, an image sensor, and/or an ISP. The flash may include a light emitting diode (LED) or a xenon lamp. Two or more lenses (IR cameras, wide-angle and telephoto lenses) and image sensors may be positioned to correspond to one surface of the electronic device 200.

The key input devices 217 may be positioned at the side surface 210C of the housing 210. Alternatively, the electronic device 200 may not include some or all of the key input devices 217, and the not included key input devices 217 may be implemented in a form of soft keys on the display 201. The key input device may include a sensor module positioned to correspond to the second surface 210B of the housing 210.

The light emitting element may be positioned to correspond to the first surface 210A inside the housing 210. The light emitting element may provide state information of the electronic device 200 in the form of light. Alternatively, the light emitting element may provide a light source interlocked with an operation of the camera module 205. The light emitting element may include an LED, an IR LED, or a xenon lamp.

The connector holes 208 and 209 may include a first connector hole 208 capable of receiving a connector (e.g., USB connector) for transmitting and receiving power and/or data to and from an external electronic device and/or a second connector hole (e.g., earphone jack) 209 capable of receiving a connector for transmitting and receiving audio signals to and from an external electronic device.

At least one electronic component (e.g., the sensor module 204 or the camera module 205 of FIG. 1) may be disposed at the bottom of at least a portion of a screen (e.g., screen display area or active area) of the display 201. For example, the at least one electronic component may be positioned at a rear surface of the screen or below or beneath the screen. The at least one electronic component may be aligned with a recess formed at the rear surface of the display 201 to be positioned inside the electronic device 200. Positions of the at least one electronic component are not visually distinguished (or exposed), and the at least one electronic component may perform a related function. For example, when viewed from above the screen in a −z-axis direction, the camera module 205 may be disposed to overlap at least a portion of the screen to obtain an image of an external subject without being exposed to the outside. When viewed from above the screen, the sensor module 204 may be disposed to overlap at least a portion of the screen to perform a corresponding sensing function without being exposed to the outside. A partial area of the display 201 at least partially overlapped with the at least one electronic component may include a pixel structure and/or a wiring structure different from that of other areas. A partial area of the display 201 at least partially overlapped with at least one electronic component may have a pixel density different from that of other areas. When various types of signals (e.g., light or ultrasonic wave) related to the at least one electronic component pass through between the outside and the at least one electronic component, a pixel structure and/or a wiring structure formed in the partial area of the display 201 at least partially overlapped with the at least one electronic component may reduce a signal loss of the electronic component. a plurality of pixels may not be disposed in the partial area of the display 201 at least partially overlapped with the at least one electronic component. The at least one electronic component (e.g., the camera module 205) may be aligned with an opening (e.g., through hole or notch) formed in the display 201 to be positioned inside the electronic device 200.

Figure 4:
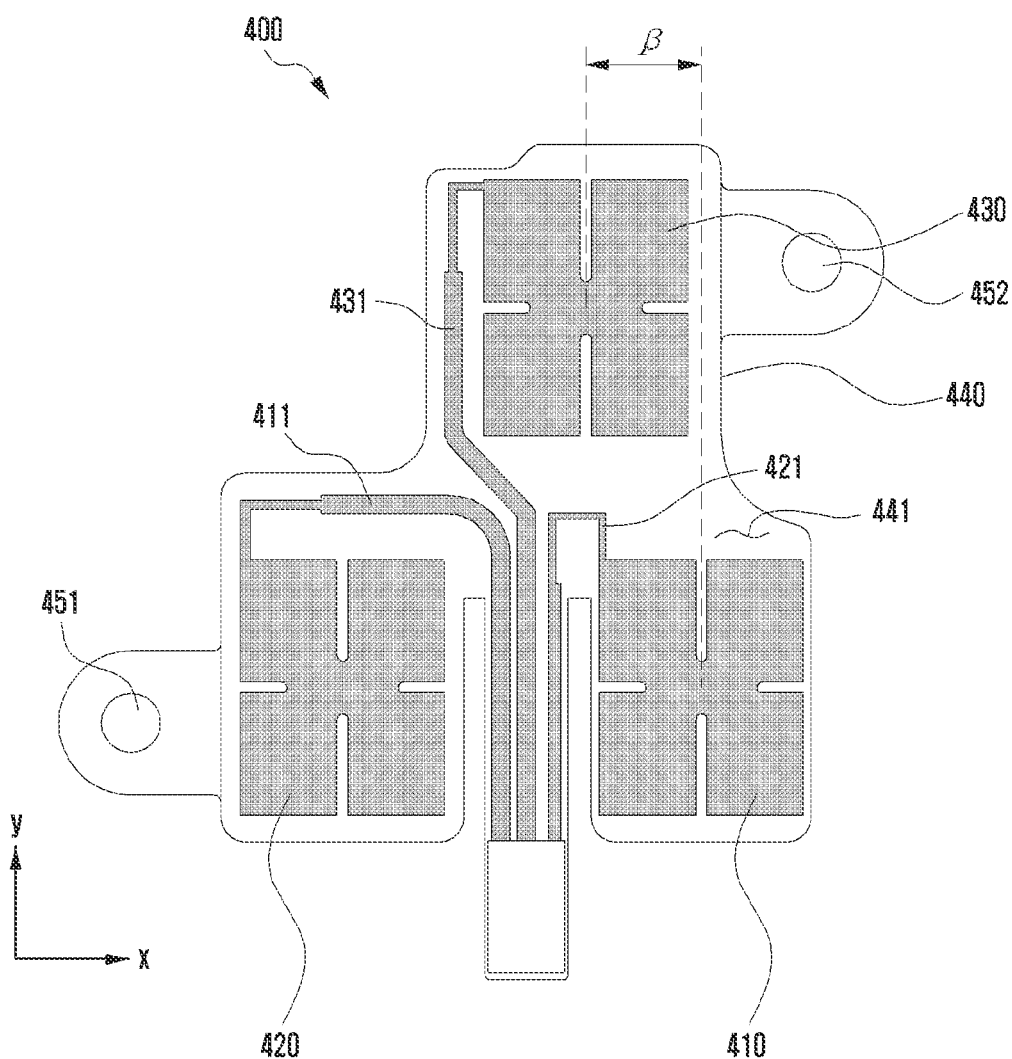
FIG. 4 illustrates an antenna structure, according to an embodiment.

FIG. 4 illustrates an antenna structure 400, according to an embodiment.

Referring to FIGS. 3 and 4, the antenna structure 400 may be positioned inside the housing 210 and transmit or receive a signal to and from the outside (e.g., external electronic device). The antenna structure 400 may include a first antenna (or first antenna radiator) 410, a second antenna (or second antenna radiator) 420, and/or a third antenna (or third antenna radiator) 430 formed with a conductor or a conductive pattern disposed in a substrate 440, such as a PCB. The antenna structure 400 may be implemented in the form of a PCB or a flexible PCB (FPCB). The antenna structure 400 may include first conductors (or first conductive patterns), a second conductor (e.g., ground plane), and a dielectric material between the first conductors and the second conductor. The first antenna 410, the second antenna 420, and/or the third antenna 430 may be a patch antenna formed with first conductors. The antenna structure 400 may include a first electrical path 411 electrically connected to the first antenna 410, a second electrical path 421 electrically connected to the second antenna 420, and/or a third electrical path 431 electrically connected to the third antenna 430. A communication circuit (e.g., the wireless communication module 192 of FIG. 1) included in the electronic device 200 may provide a current through the first electrical path (e.g., first feeder) 411, the second electrical path (e.g., second feeder) 421, and the third electrical path (e.g., third feeder) 431.

The substrate 440 may include one surface 441 and the other surface facing in opposite directions. One surface 441 of the substrate 440 may be positioned toward the rear surface 210B or the rear plate 211 of the electronic device 200 and be substantially parallel to the rear surface 210B or the rear plate 211. The first antenna 410, the second antenna 420, and/or the third antenna 430 may be disposed on one surface 441 of the substrate 440, or may be positioned inside the substrate 440 adjacent to one surface 441 among one surface 441 and the other surface of the substrate 440. Positions of the first antenna 410, the second antenna 420, and/or the third antenna 430 are not limited to the embodiment of FIG. 3 and these antennae may be disposed at various other positions of the electronic device 200.

The substrate 440 may include at least one opening 451 and 452 used for disposing the antenna structure 400 in the housing 210. For example, one opening 451 may be disposed in an area of the substrate 440 adjacent to the second antenna 420, and another opening 452 may be disposed in an area of the substrate 440 adjacent to the third antenna 430. The antenna structure 400 may be disposed in the housing 210 using plastic welding corresponding to the at least one opening 451 and 452. Alternatively, the antenna structure 400 may be disposed in the housing 210 using bolt fastening corresponding to the at least one opening 451 and 452. The antenna structure 400 may be positioned at a support structure or support member positioned inside the housing 210. A position or the number of openings used for disposing the antenna structure 400 in the housing 210 is not limited to the illustrated embodiment and may vary. The antenna structure 400 may be disposed in the housing 210 using a polymer adhesive material, such that at least one opening 451 and 452 may be omitted. The antenna structure 400 may be positioned at the electronic device 200 through various other method.

The first antenna 410, the second antenna 420, and the third antenna 430 may have substantially the same form when viewed from above the rear surface 210B of the electronic device 200 in the +z axis. In various embodiments, a plurality of antennas including the first antenna 410, the second antenna 420, and the third antenna 430 may be an antenna array. In various embodiments, antennas included in the antenna structure 400 are not limited to the embodiment illustrated in FIG. 4 and may be provided in various other numbers. For example, the electronic device 200 may include one antenna structure for identifying a first angle at which a signal is received with respect to the x-axis and another antenna structure for identifying a second angle at which a signal is received with respect to the y-axis. In this case, the antenna structure 400 may include two antennas.

The electronic device 200 may perform a location determination function of a signal source (e.g., transmitter or Tx device) using the first antenna 410, the second antenna 420, and the third antenna 430. The electronic device 200 may identify an angle in which a signal is received using a time difference between signals received through two antennas and a phase difference resulting therefrom. The signal reception angle may include a first angle (e.g., first signal reception angle) with respect to a configured x-axis (e.g., reference x-axis) (e.g., first axis) of the electronic device 200, and a second angle (e.g., second signal reception angle) with respect to a configured y-axis (e.g., reference y-axis) (e.g., second axis) of the electronic device 200. The electronic device 200 may identify a first angle at which a signal is received with respect to the x-axis using the first antenna 410 and the second antenna 420. The electronic device 200 may identify a second angle at which a signal is received with respect to the y-axis using the first antenna 410 and the third antenna 430. FIG. 3 or 4 illustrates an example of identifying the first angle and the second angle using three antennas, but the disclosure is not limited thereto and an embodiment of identifying the first angle and the second angle using more antennas may also be possible, and an antenna separate from the antenna structure 400 may be used. An x-axis (e.g., reference x-axis) (e.g., first axis) and a y-axis (e.g., reference y-axis) (e.g., second axis) may form an angle of 90 degrees.

Figure 5A:
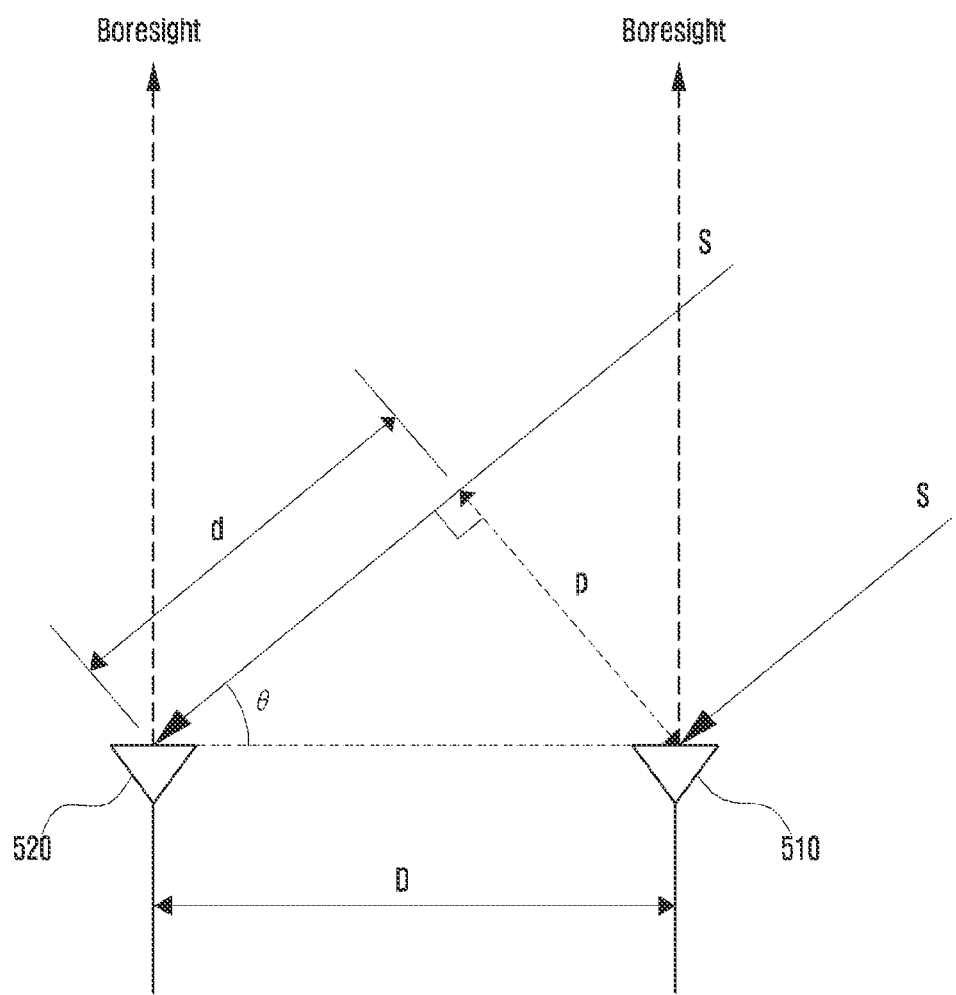
FIGS. 5A and 5B illustrate a method for identifying a signal reception angle, according to an embodiment.

The antenna structure 400 may focus electromagnetic waves in a −z axis direction toward the rear surface 210B of the electronic device 200 or may have directivity capable of transmitting and receiving waves. The first antenna 410, the second antenna 420, and/or the third antenna 430 may form a beam pattern (or antenna radiation pattern that may be an idle area capable of radiating or detecting a signal. The beam pattern may include a main beam (or main lobe) formed in a maximum radiation direction (boresight), as illustrated in FIG. 5A. The main beam refers to a beam radiating a relatively large amount of energy, and the first antenna 410, the second antenna 420, or the third antenna 430 may transmit and/or receive a frequency signal substantially through the main beam and may form the main beam in a—z-axis direction toward the rear surface 210B of the electronic device 200.

Figure 5B:
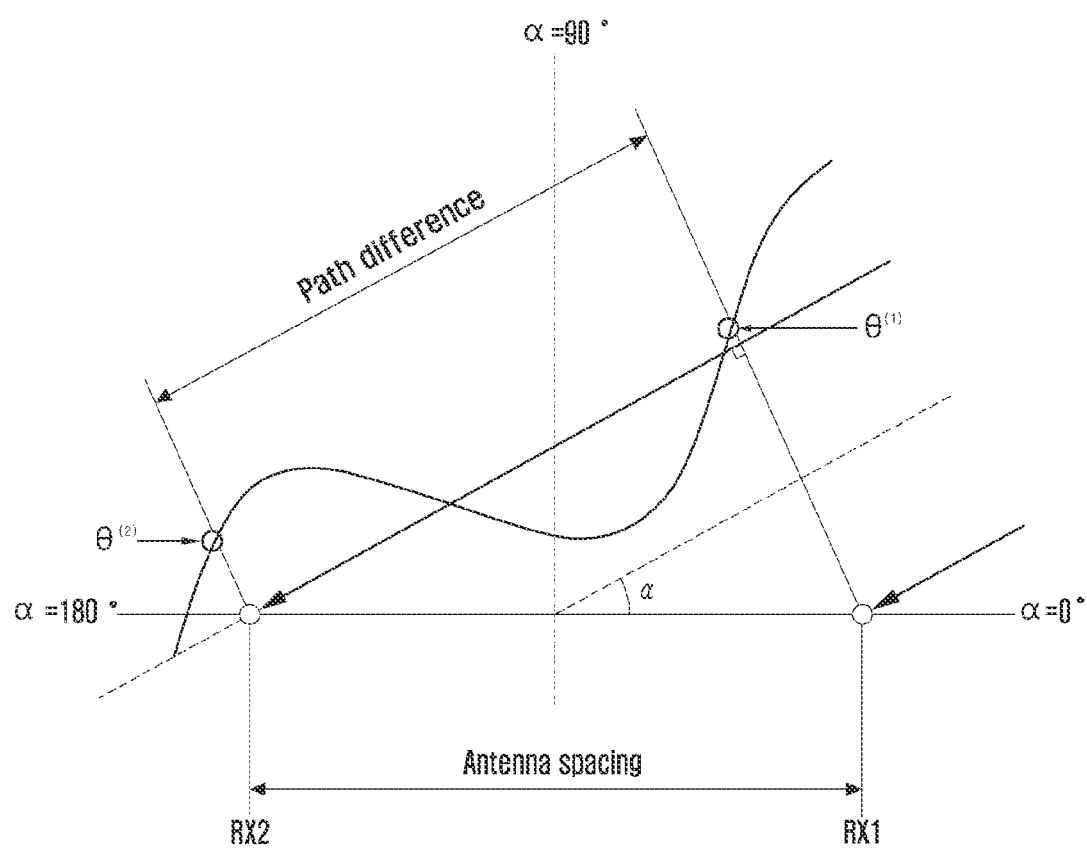

FIGS. 5A and 5B illustrate a method for identifying a signal reception angle, according to an embodiment.

Referring to FIGS. 5A and 5B, when two antennas 510 and 520 (e.g., the first antenna 410 and the second antenna 420 of FIG. 4, or the first antenna 410 and the third antenna 430 of FIG. 4) receive a signal S with a time difference, there may be a phase difference between a signal received through one antenna 510 and a signal received through the other antenna 520. The electronic device may identify angle information about a signal source using a phase difference between signals received through the two antennas 510 and 520. The signal reception angle may be identified through a calculation method of Equation (1) below, and in the memory of the electronic device, instructions for enabling a control circuit to perform an operation related thereto may be stored.

$$\theta = \arcsin\frac{\alpha\lambda}{2\pi d} \quad (1)$$

In Equation (1):
θ: angle to signal source (e.g., AOA angle)
α: phase difference between signals received through two antennas
d: path difference
λ: wavelength of a signal A distance D between the two antennas 510 and 520 may have substantially a half wavelength of a wavelength of a signal S transmitted from the signal source, and a value of a phase difference between signals received through the two antennas 510 and 520 may be up to 180 degrees. The distance D between the two antennas 510 and 520 may be a distance D between a center of one antenna 510 and a center of the other antenna 520.

The distance D between the two antennas 510 and 520 may be a length of ½ (half) wavelength or less of a wavelength of the signal S transmitted from the signal source. For example, the distance D between the two antennas 510 and 520 may be a half wavelength of a wavelength λ of the signal S transmitted from the signal source to a quarter (¼) length of a wavelength λ of the signal S transmitted from the signal source.

The first antenna 410 and the second antenna 420 used for identifying a first angle at which a signal is received with respect to the configured x-axis of the electronic device 200 may be aligned in the x-axis direction. The first angle at which a signal is received with respect to the x-axis may be identified through a method described with reference to FIGS. 5A and 5B and Equation (1).

The first antenna 410 and the third antenna 430 used for identifying a second angle at which a signal is received with respect to the configured y-axis of the electronic device 200 may be misaligned in the y-axis direction. For example, the first antenna 410 and the third antenna 430 may be misaligned in the y-axis direction due to the relationship with other elements in the electronic device 200. The misalignment state of the first antenna 410 and the third antenna 430 may cause a recognition error of the second angle at which a signal is received with respect to the y-axis.

The first antenna 410 and the second antenna 420 used for identifying a first angle at which a signal is received with respect to the configured x-axis of the electronic device 200 may be misaligned in the x-axis direction, and the first antenna 410 and the third antenna 430 used for identifying the second angle at which a signal is received with respect to the configured y-axis of the electronic device 200 may be misaligned in the y-axis direction. For example, due to a relationship with other elements in the electronic device 200, the first antenna 410 and the second antenna 420 may be misaligned in the x-axis direction, and the first antenna 410 and the third antenna 430 may be misaligned in the y-axis direction. Even in this case, an operation or method used in the detailed description to be described later may be applied.

Figure 6:
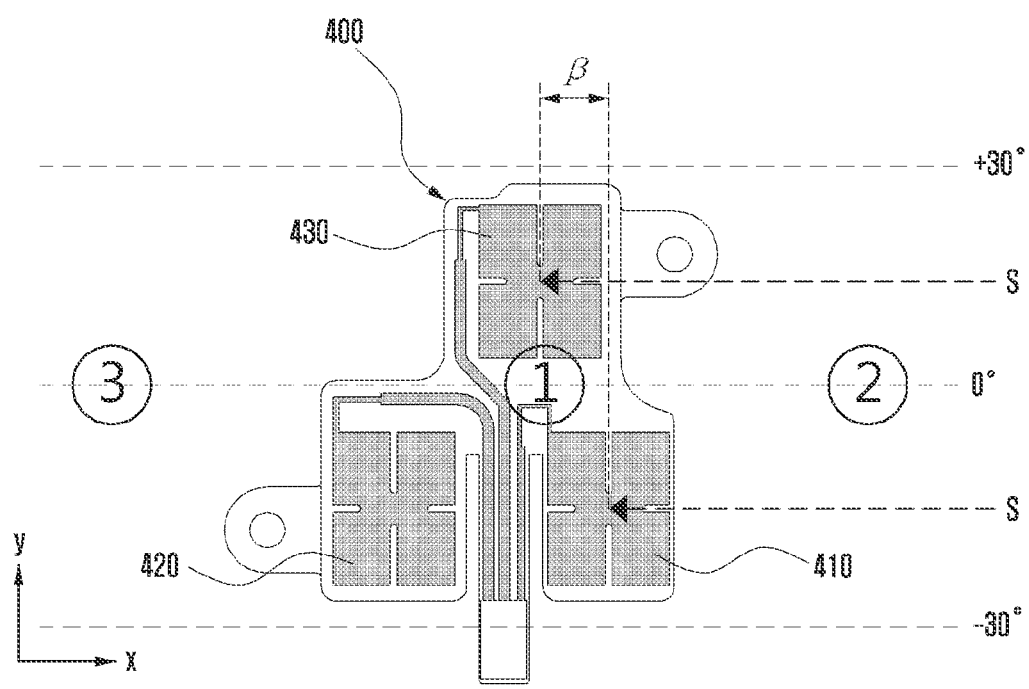
FIG. 6 illustrates a recognition error of a signal reception angle, according to an embodiment.

FIG. 6 illustrates a recognition error of a signal reception angle, according to an embodiment.

Referring to FIG. 6, reference numeral '①,' denotes a first case in which an angle formed by a signal source with the y-axis is 0 and in which the antenna structure 500 is positioned in a maximum radiation direction forming a main beam. Reference numeral '②' denotes a second case in which an angle formed by a signal source with the y-axis is 0 and in which the antenna structure 500 forms an angle of −90 degrees with a maximum radiation direction. Reference numeral '③' denotes a third case in which an angle formed by a signal source with the y-axis is 0 and in which the antenna structure 500 forms an angle of +90 degrees with a maximum radiation direction. The first case ①, the second case ②, or the third case ③ may be formed due to a rotation of the electronic device 200 or a movement of the signal source. In the first case ①, regardless of a misalignment state of the first antenna 410 and the third antenna 430, a second angle with respect to the signal source may be recognized as substantially 0 degrees. In the second case ② or the third case ③, a misalignment distance β in which the first antenna 410 and the third antenna 430 are misaligned may cause a time difference between signals received by the first antenna 410 and the third antenna 430 and a phase difference resulting therefrom, whereby there may be an error that the second angle to the signal source is recognized as a non-zero angle (e.g., +30 degrees in the second case ②, or −30 degrees in the third case ③). Even when an angle formed by the signal source with the y-axis is 0 and the antenna structure 500 forms an acute angle with the maximum radiation direction, there may be an error in which the second angle to the signal source is recognized as a non-zero angle due to the misalignment state of the first antenna 410 and the third antenna 430.

The first antenna 410 and the second antenna 420 may be misaligned in the x-axis direction, and the first antenna 410 and the third antenna 430 may be aligned in the y-axis direction. In this case, due to the misalignment distance between the first antenna 410 and the second antenna 420, there may be an error in the first angle with respect to the signal source.

Figure 7:
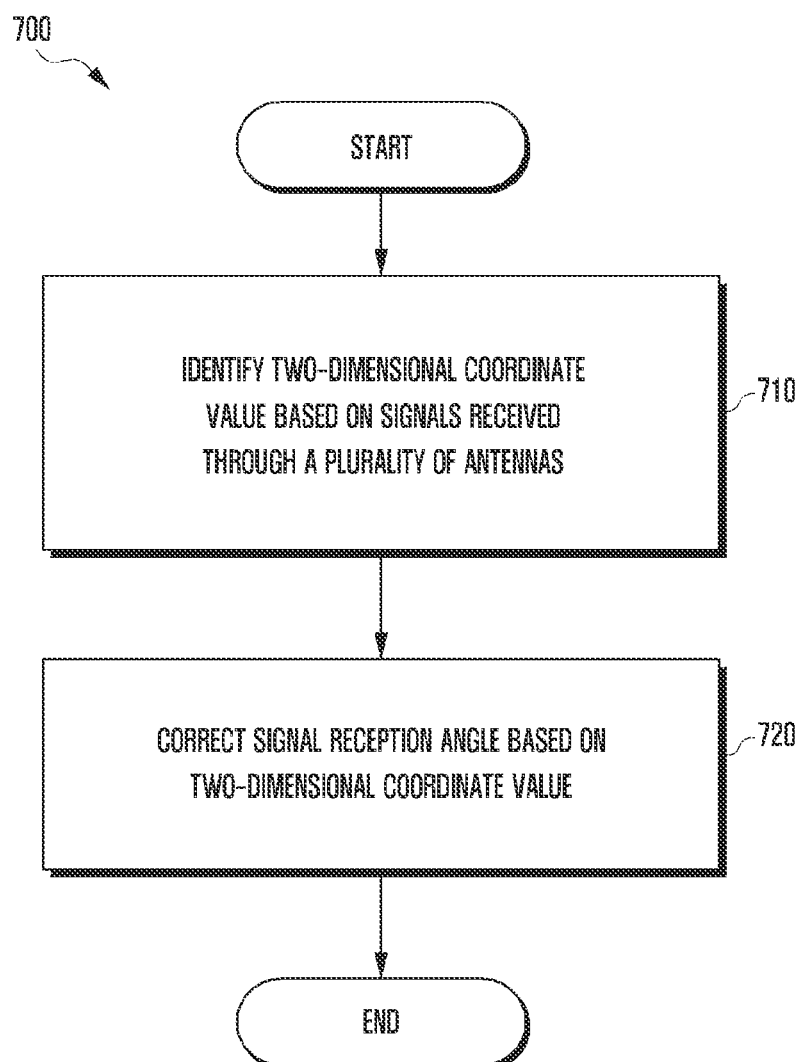
FIG. 7 illustrates a method of an electronic device for reducing a recognition error of a signal reception angle, according to an embodiment.

FIG. 7 illustrates a method 700 of the electronic device 200 for reducing a recognition error of a signal reception angle, according to an embodiment. The operation flow of FIG. 7 may be implemented by a control circuit (e.g., the processor 120 of FIG. 1) included in the electronic device 200.

Referring to FIG. 7, in step 710, the control circuit may identify a two-dimensional coordinate value using signals received through a plurality of antennas included in the electronic device 200. In step 720, the control circuit may correct a signal reception angle based on the two-dimensional coordinate value.

Figure 8:
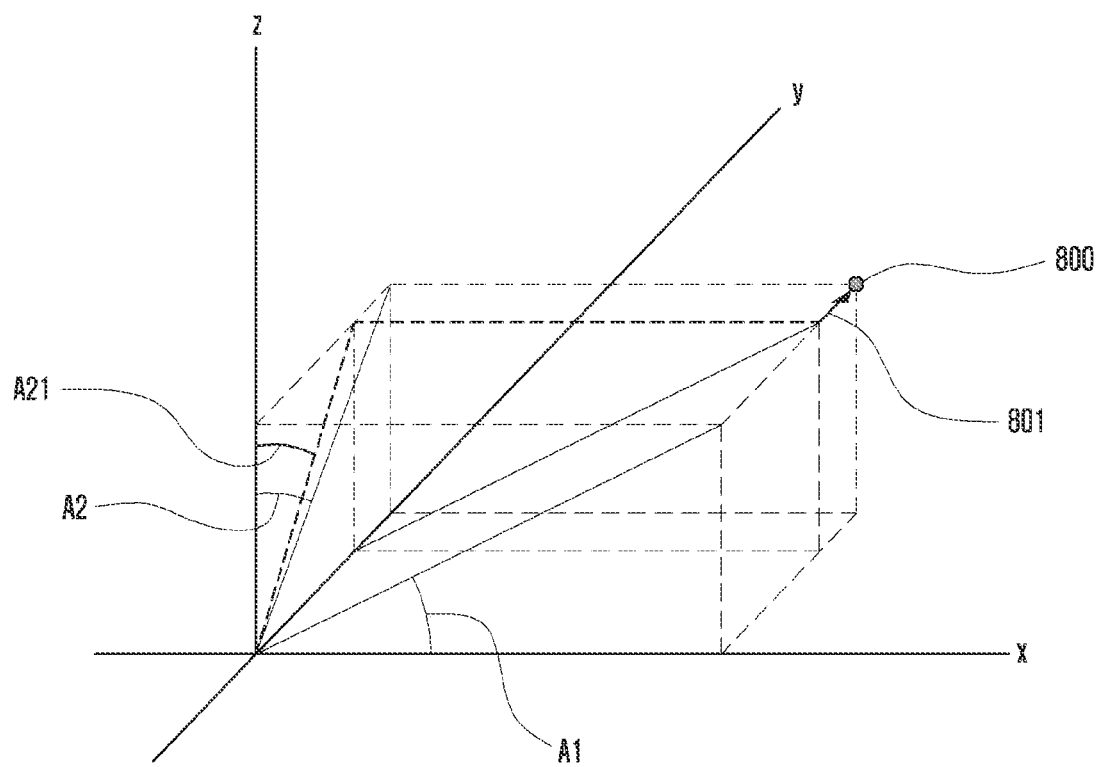
FIGS. 8 and 9 further illustrate the method of FIG. 7, according to an embodiment.
Figure 9:
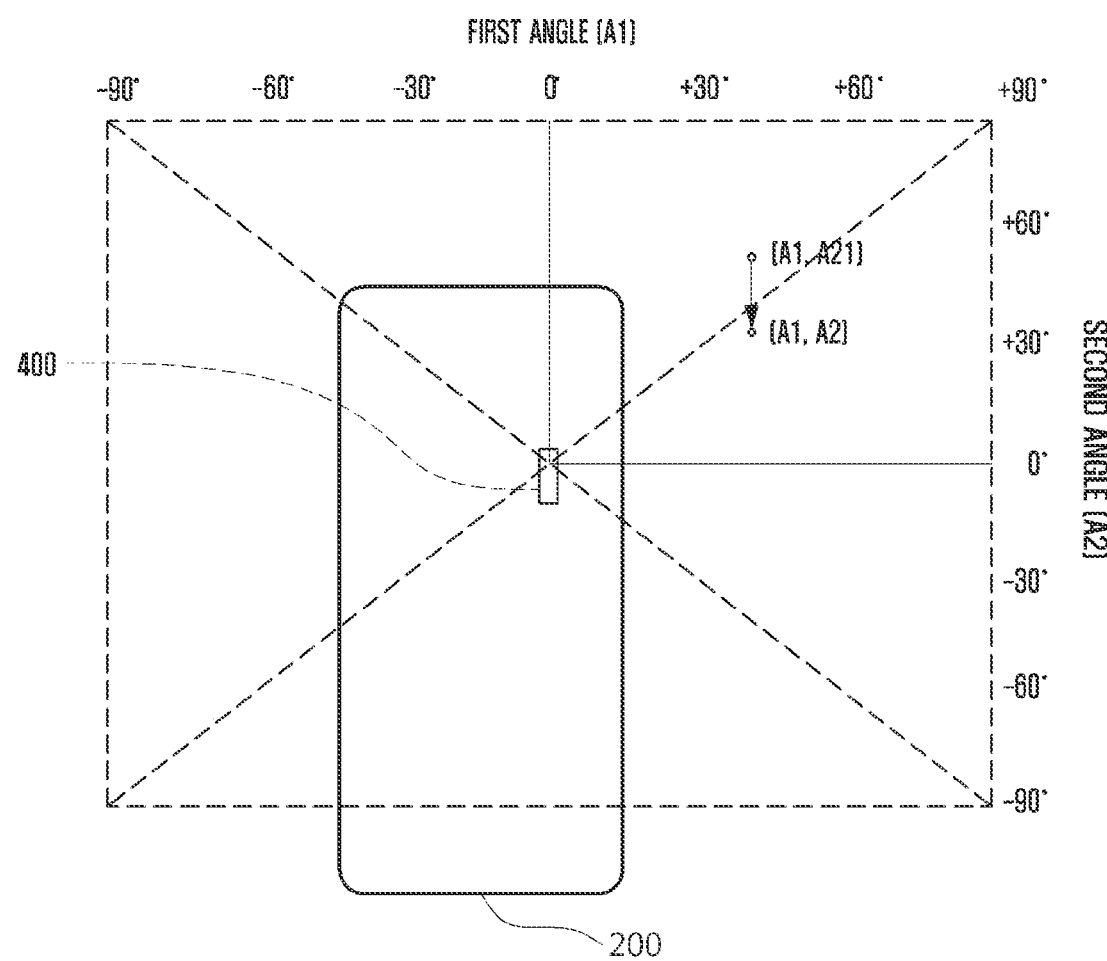

FIGS. 8 and 9 further illustrate the method of FIG. 7, according to an embodiment. Referring to FIGS. 4, 8, and 9, the control circuit may identify a first signal reception angle A1 at which a signal is received with respect to a configured x-axis of the electronic device 200 using signals received from a signal source 800 through the first antenna 410 and the second antenna 420. The control circuit may identify a second signal reception angle A2 at which a signal is received with respect to the configured y-axis of the electronic device 200 using signals received from the signal source 800 through the first antenna 410 and the third antenna 430. The control circuit may generate two-dimensional coordinate values A1 and A2 using the first signal reception angle A1 and the second signal reception angle A2. The first signal reception angle A1 may also be referred to as a first coordinate value, and the second signal reception angle A2 may also be referred to as a second coordinate value.

FIG. 9 illustrates a two-dimensional coordinate system perpendicular to a maximum radiation direction (boresight) of the antenna structure 400, according to an embodiment. The control circuit may perform various operations of an application related to a location determination function using the two-dimensional coordinate values A1 and A2. For example, the control circuit may estimate a position of the signal source based on the two-dimensional coordinate values A1 and A2. As in the embodiment of FIG. 4, the first antenna 410 and the third antenna 430 may be misaligned in the y-axis direction, thereby causing a recognition error to occur. The control circuit may be configured to determine a compensation value based on the first angle (or first coordinate value) A1 and a misalignment distance § of the first antenna 410 and the third antenna 430. The control circuit may be configured to correct the second angle (or second coordinate value) using the compensation value 801.

The first antenna 410 and the second antenna 420 may be misaligned in an x-axis direction, and the first antenna 410 and the third antenna 430 may be aligned in a y-axis direction. In this case, a recognition error of the first angle A1 may occur due to a misalignment distance between the first antenna 410 and the second antenna 420. The control circuit may be configured to determine a compensation value based on the second angle (or second coordinate value) A2 and the misalignment distance of the first antenna 410 and the second antenna 420 and to correct the first angle (or first coordinate value) using the compensation value.

The control circuit may correct a second angle at which a signal is received with respect to the y-axis based on an algorithm in consideration of FIG. 5A and Equation (2) below.

$$\theta_{offset} = \arcsin((\alpha 2 - \frac{\alpha 1}{\frac{\lambda}{2}} \times \beta) \times \frac{\lambda}{2\pi d}) \quad (2)$$

$$p = d \times \sin(\theta)$$

$$\lambda = \frac{2\pi c}{f}$$

$$\alpha = \frac{2\pi}{\lambda} \times p = \frac{f}{c} \times p$$

In Equation (2):

$\theta_{offset}$: Corrected angle of a second angle at which a signal is received with respect to the y-axis (e.g., corrected AOA angle)

$\alpha 2$: Phase difference between signals received through the first antenna 410 and the third antenna 430

$\alpha 1$: Phase difference between signals received through the first antenna 410 and the second antenna 420 p: Path length d: Path difference

β: Misalignment distance f: Frequency of a signal

λ: Wavelength of a signal c: Speed of light

Correction of the signal reception angle may be performed based on predetermined table information stored in the memory (e.g., the memory 120 of FIG. 1) based on experimental data. Table 1 below represents a compensation value corresponding to the phase difference a between signals received through the first antenna 410 and the second antenna 420 when the misalignment distance β of the first antenna 410 and the third antenna 430 is about 4 mm.

TABLE 1

| α | −180 degree~ −121 degree | −120 degree~ −61 degree | −60 degree~ −31 degree | −30 degree~ 0 degree | +1 degree~ +30 degree | +31 degree~ +60 v | +61 degree~ +120 v | +121 v~ +180 degree |
|---|---|---|---|---|---|---|---|---|
| compensation value | +50 degree | +35 degree | +20 degree | +10 degree | −10 degree | −20 degree | −35 degree | −50 degree |

Figure 10:
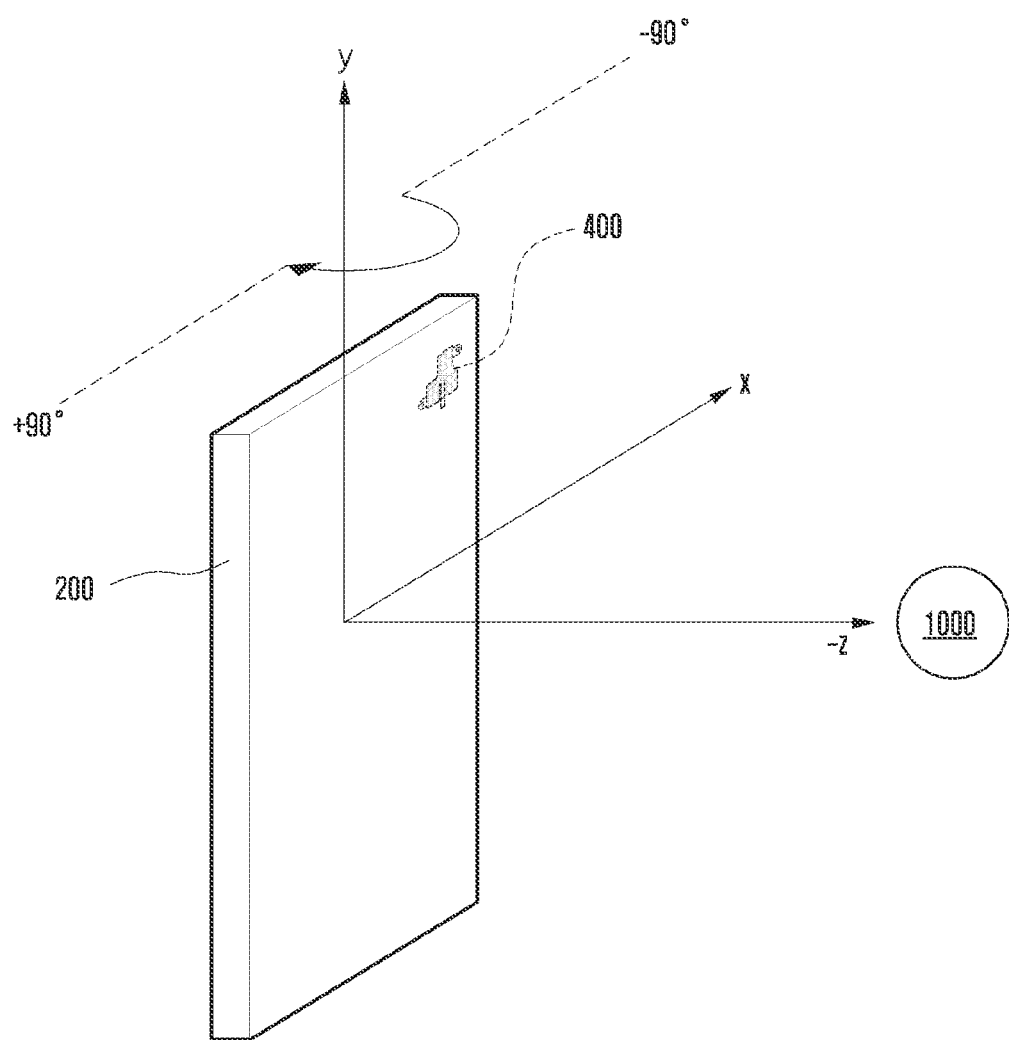
FIGS. 10 and 11 illustrate a method for determining a compensation value for a misalignment state of a first antenna and a third antenna corresponding to a phase difference between signals received through the first antenna and a second antenna, according to an embodiment.
Figure 11:
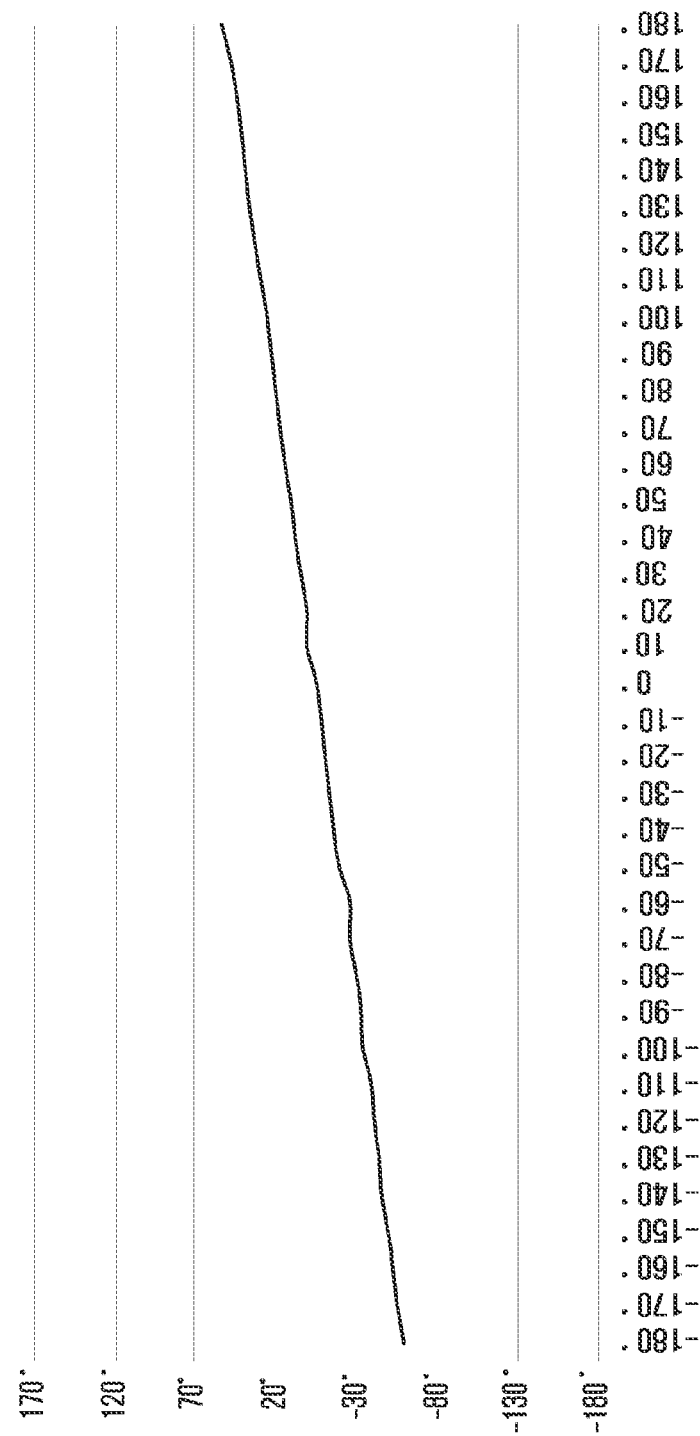

FIGS. 10 and 11 illustrate a method for determining a compensation value for a misalignment state of the first antenna 410 and the third antenna 430 corresponding to a phase difference between signals received through the first antenna 410 and the second antenna 420, according to an embodiment.

Referring to FIG. 10, while a second angle at which a signal from a signal source 1000 is received with respect to the y-axis is configured to substantially 0 and the electronic device 200 is rotated about the y-axis, a phase difference between signals received through the first antenna 410 and the second antenna 420 may be measured. In relation to FIG. 10, in the graph of FIG. 11, a horizontal axis indicates a phase difference between signals received through the first antenna 410 and the second antenna 420 according to a rotation angle of the electronic device 200. In relation to FIG. 10, in the graph of FIG. 11, a vertical axis indicates a phase difference between signals received through the first antenna 410 and the third antenna 430 according to a rotation angle of the electronic device 200.

Referring to FIG. 11, a second angle at which a signal from the signal source 1000 is received with respect to the y-axis is substantially 0, but due to a misalignment state of the first antenna 410 and the third antenna 430, a phase difference (see the vertical axis) between signals received through the first antenna 410 and the third antenna 430 may be a non-zero value. A compensation value for a misalignment state of the first antenna 410 and the third antenna 430 may be for correcting a phase difference between signals received through the first antenna 410 and the third antenna 430 to 0 corresponding to a phase difference between signals received through the first antenna 410 and the second antenna 420. The compensation value may be determined based on Equation (2). For example, referring to Table 1, when the phase difference between signals received through the first antenna 410 and the second antenna 420 is 40 degrees, the compensation value may be −20 degrees.

Figure 12:
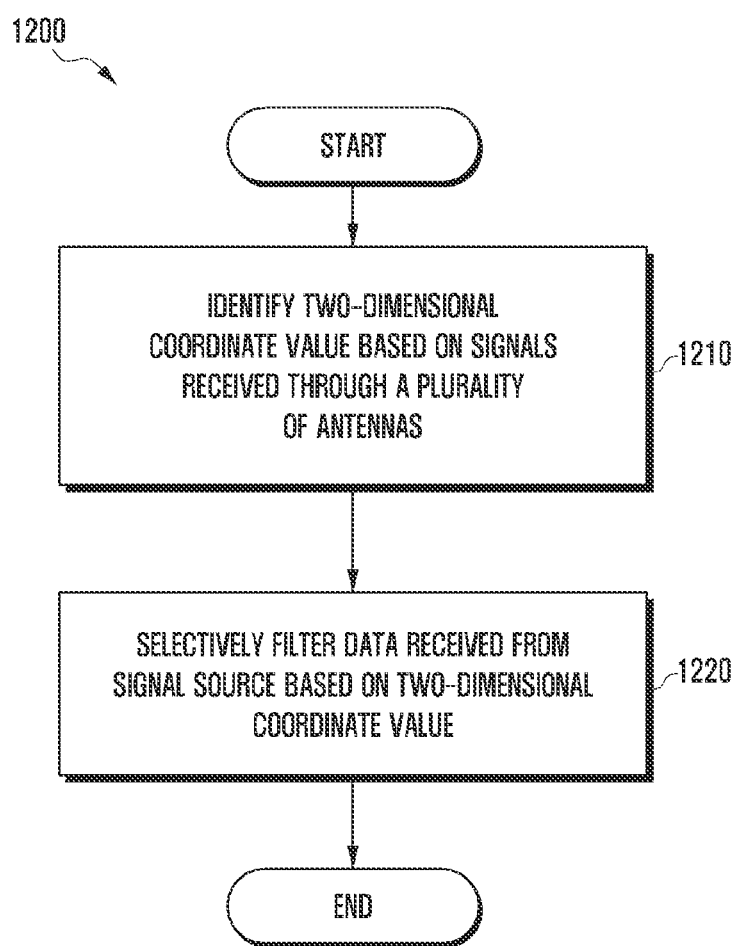
FIG. 12 illustrates a method of an electronic device for improving reliability of data received from a signal source, according to an embodiment.

FIG. 12 illustrates a method 1200 of the electronic device 200 for improving reliability of data received from a signal source, according to an embodiment. The method of FIG. 12 may be implemented by a control circuit included in the electronic device 200.

Referring to FIG. 12, in step 1210, the control circuit may identify a two-dimensional coordinate value using signals received through a plurality of antennas included in the electronic device 200. In step 1220, the control circuit may selectively filter data received from a signal source based on the two-dimensional coordinate value.

FIGS. 13A, 13B, 13C, 14A, 14B, 14C, and 15 further illustrate the method of FIG. 12, according to an embodiment.

In a first measurement condition 1310, the electronic device 200 may rotate about a central axis C forming an angle of 60 degrees with the y-axis in a state tilted by −60 degrees about the x-axis. A first graph 1311 may represent a measured value of a first angle in which a signal transmitted from a signal source 1300 is received with respect to the x-axis using the first antenna 410 and the second antenna 420 of FIG. 4 when the electronic device 200 is rotated about the central axis C in the first measurement condition 1310.

Figure 13A:
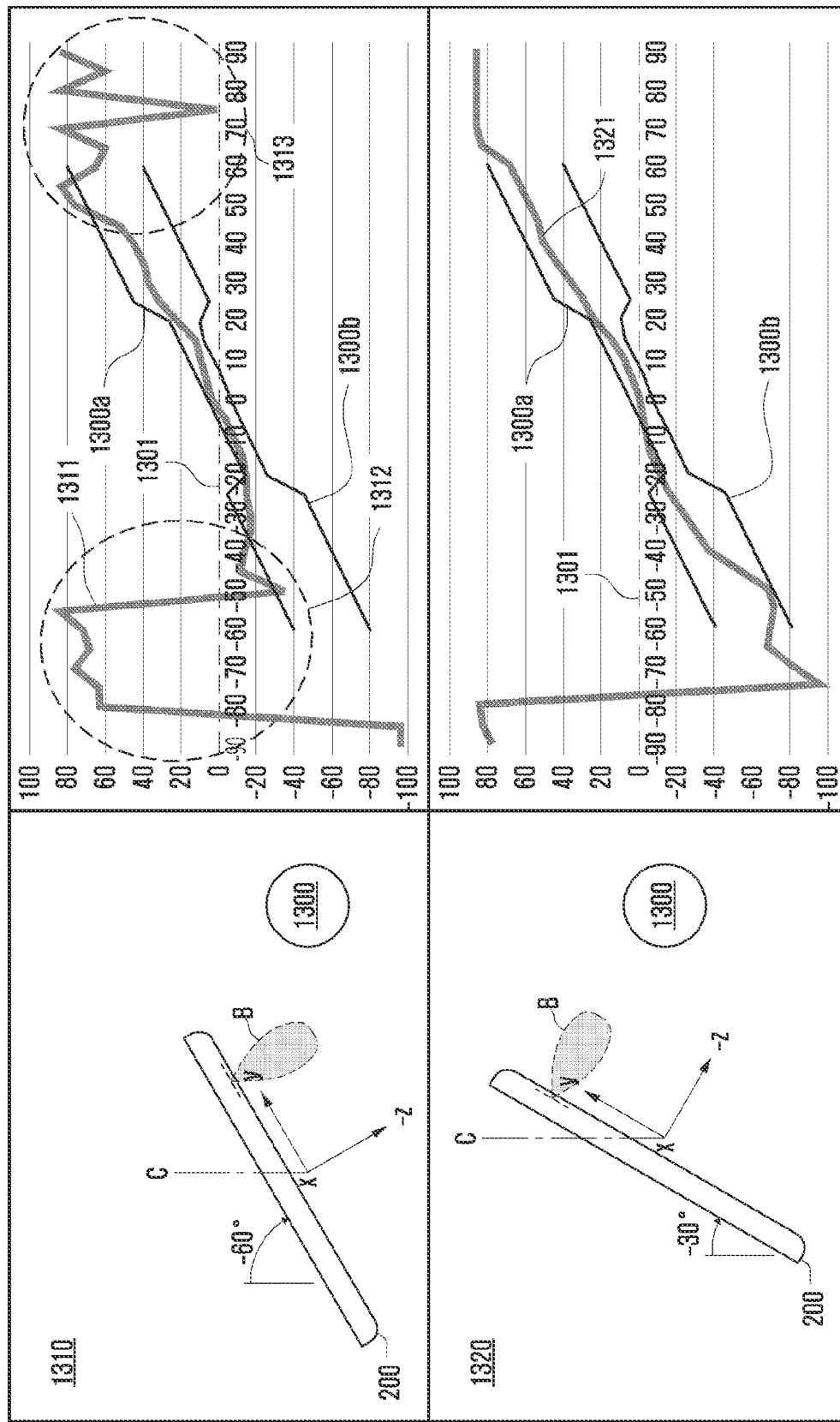
FIGS. 13A, 13B, 13C, 14A, 14B, 14C, and 15 further illustrate the method of FIG. 12, according to an embodiment.
Figure 13B:
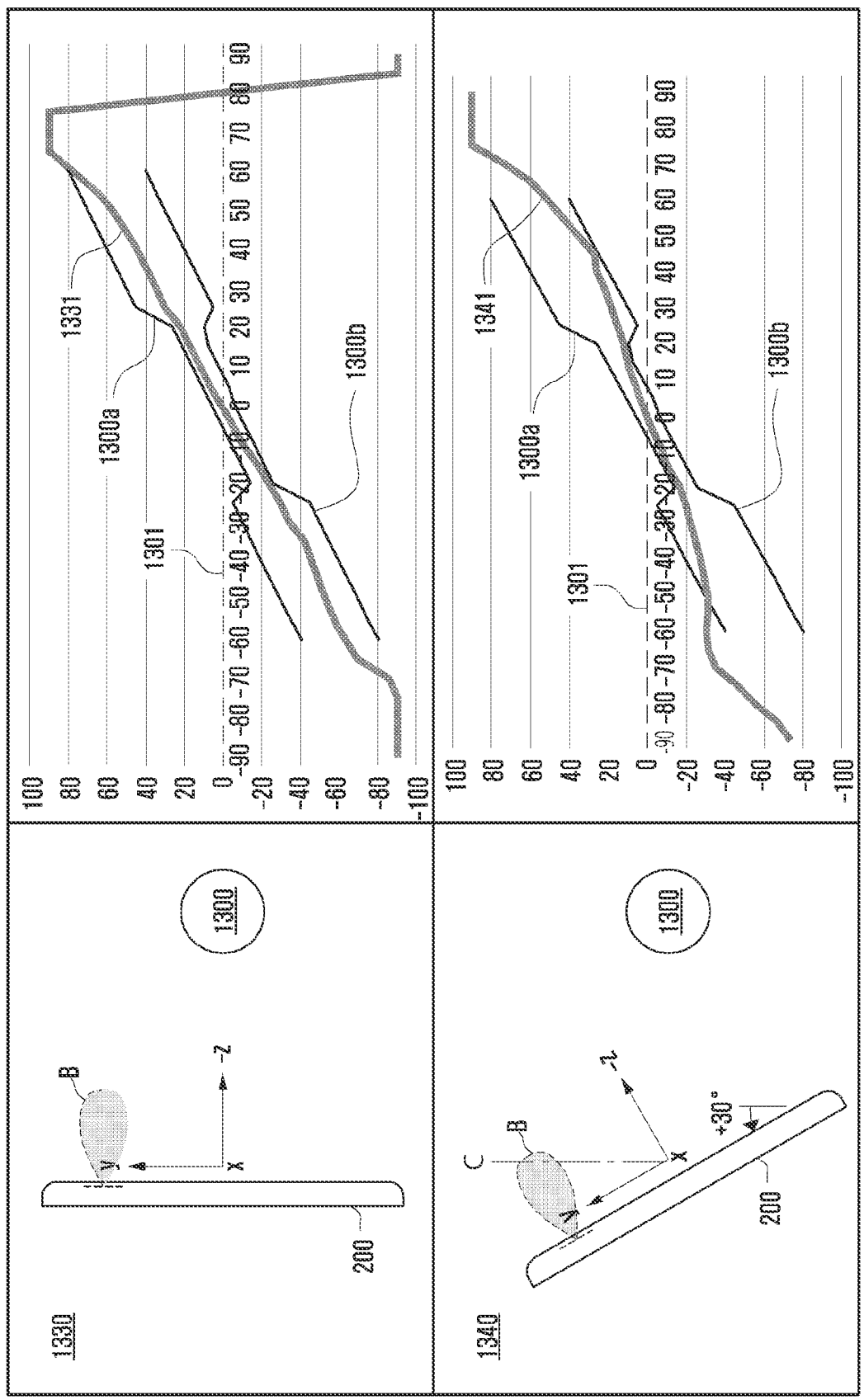
Figure 13C:
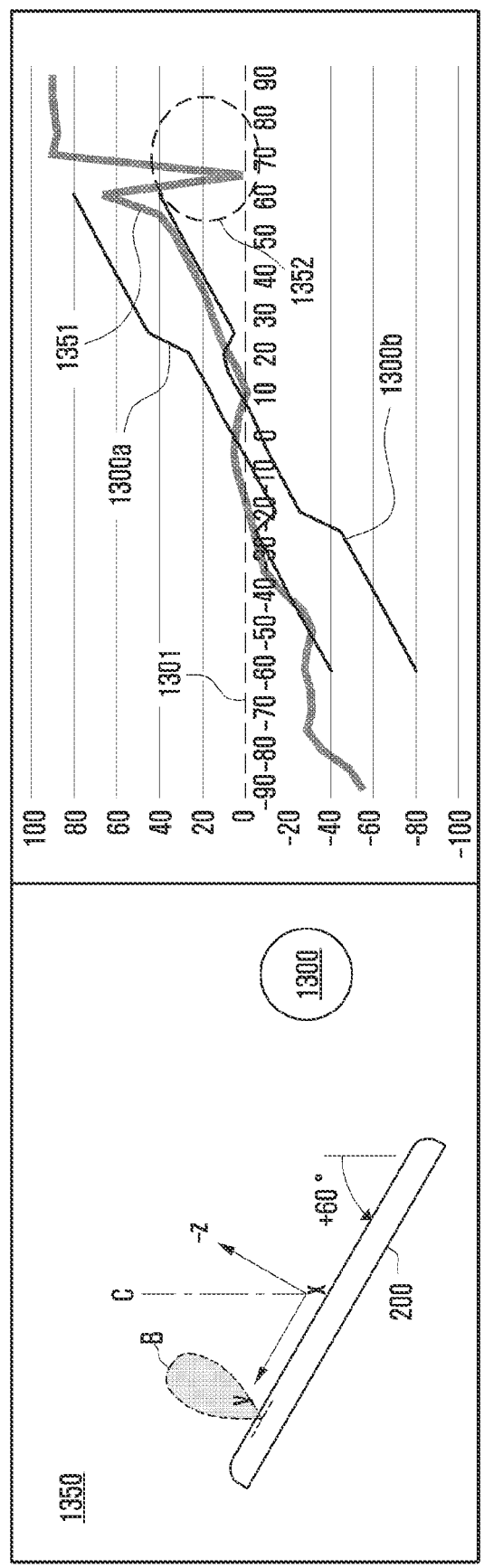

In the graphs of FIGS. 13A, 13B, and 13C, a horizontal axis 1301 may indicate an angle at which the electronic device 200 rotates about the central axis C.

According to a second measurement condition 1320' of FIG. 13A, the electronic device 200 may rotate about the central axis C forming an angle of 30 degrees with the y axis in a state tilted by −30 degrees about the x axis. A second graph 1321 may represent a measured value of a first angle at which a signal transmitted from the signal source 1300 is received with respect to the x-axis using the first antenna 410 and the second antenna 420 of FIG. 4 when the electronic device 200 is rotated about the central axis C in the second measurement condition 1320.

According to a third measurement condition 1330 of FIG. 13B, the electronic device 200 may be rotated about the y-axis without being tilted about the x-axis. A third graph 1331 may represent a value obtained by measuring a first angle at which a signal transmitted from the signal source 1300 is received with respect to the x-axis using the first antenna 410 and the second antenna 420 of FIG. 4 when the electronic device 200 is rotated about the central axis C in the third measurement condition.

According to a fourth measurement condition 1340 of FIG. 13B, the electronic device 200 may rotate about the central axis C forming an angle of 60 degrees with the y axis in a state tilted by +30 degrees about the x axis. A fourth graph 1341 may represent a value obtained by measuring a first angle at which a signal transmitted from the signal source 1300 is received with respect to the x-axis using the first antenna 410 and the second antenna 420 of FIG. 4 when the electronic device 200 is rotated about the central axis C in the fourth measurement condition.

In a fifth measurement condition 1350 in FIG. 13C, the electronic device 200 may rotate about the central axis C forming an angle of 60 degrees with the y axis in a state tilted by +60 degrees about the x axis. A fifth graph 1351 may represent a value obtained by measuring a first angle in which a signal transmitted from the signal source 1300 is received with respect to the x-axis using the first antenna 410 and the second antenna 420 of FIG. 4 when the electronic device 200 is rotated about the central axis C.

Figure 14A:
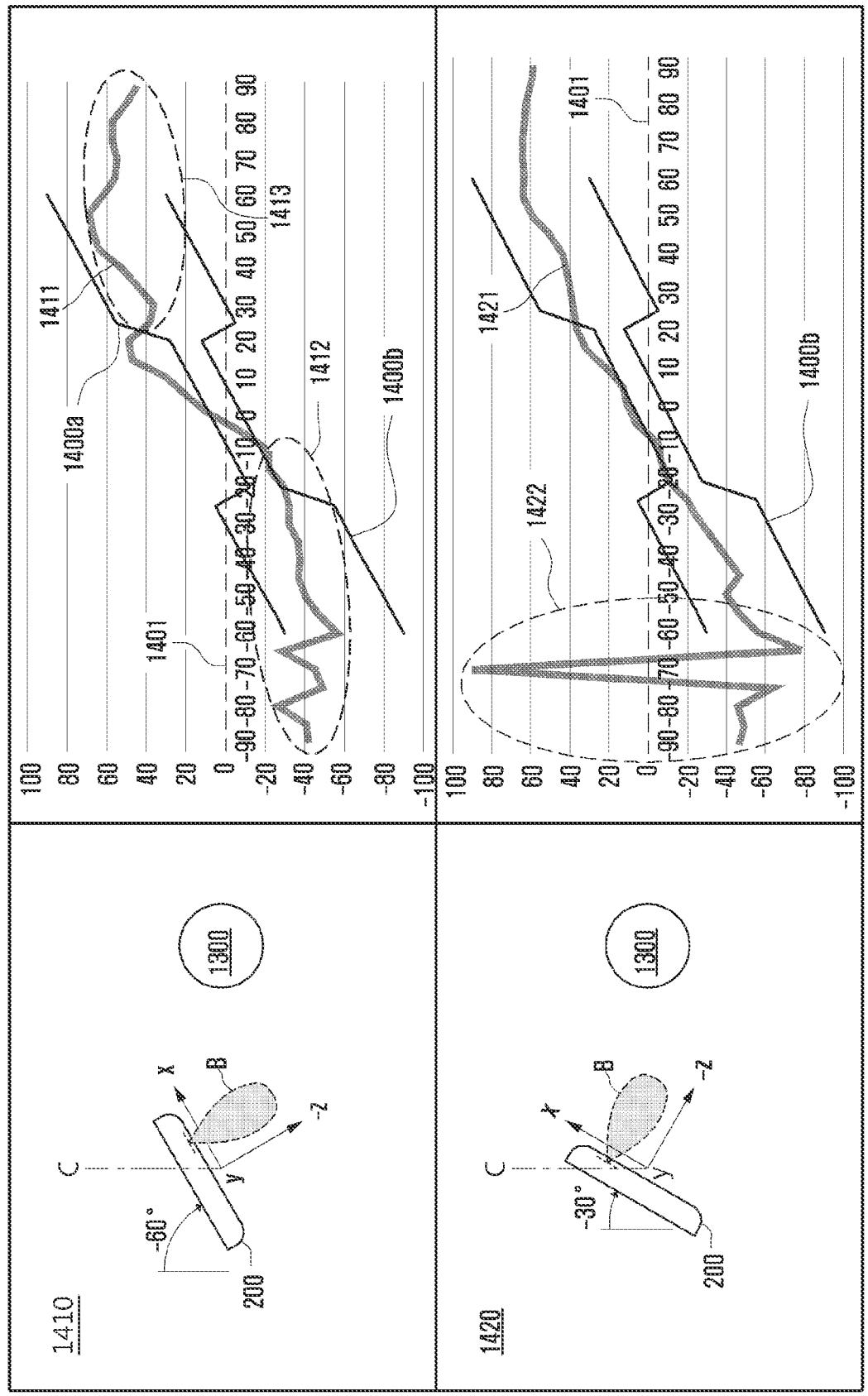
Figure 14B:
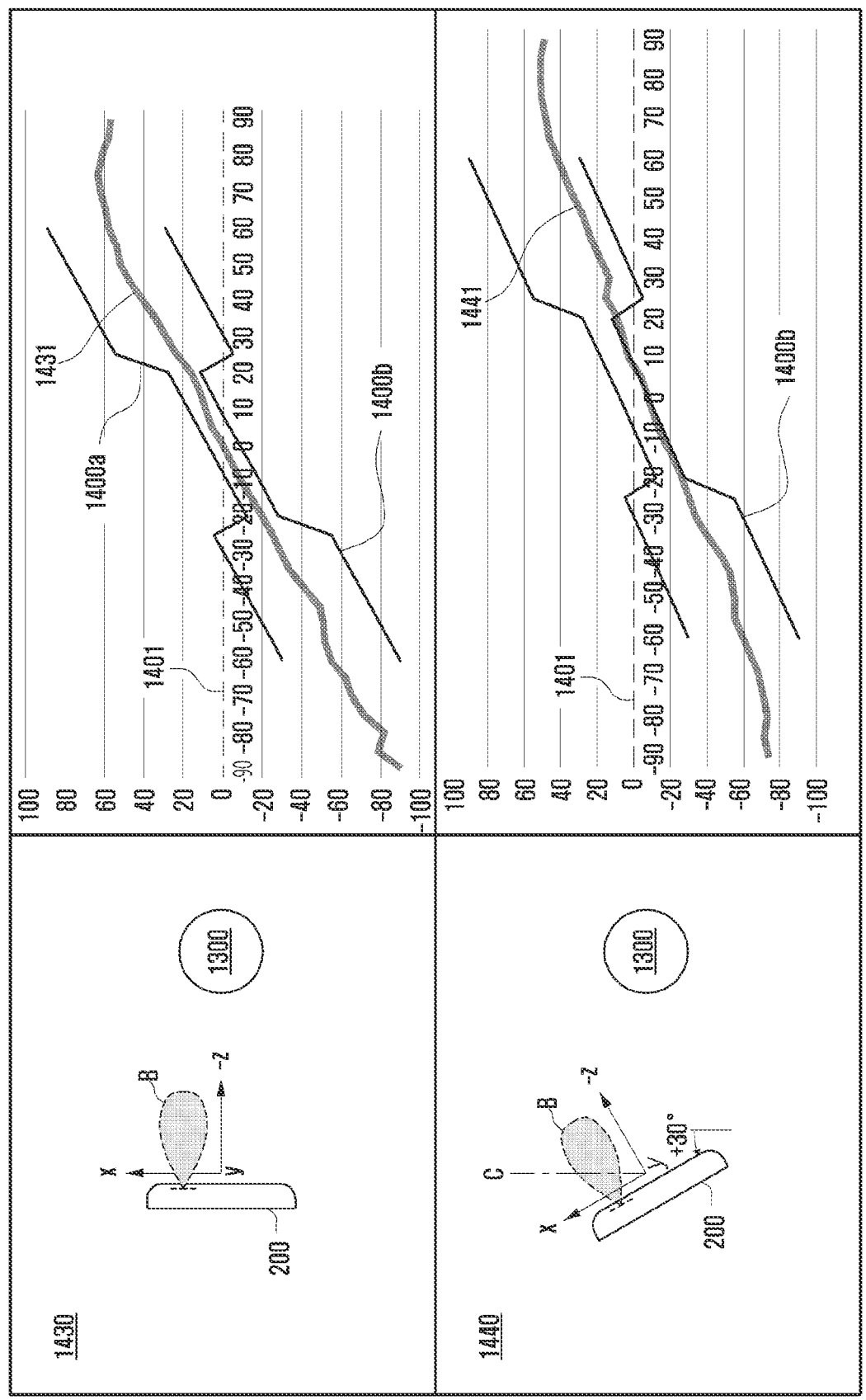
Figure 14C:
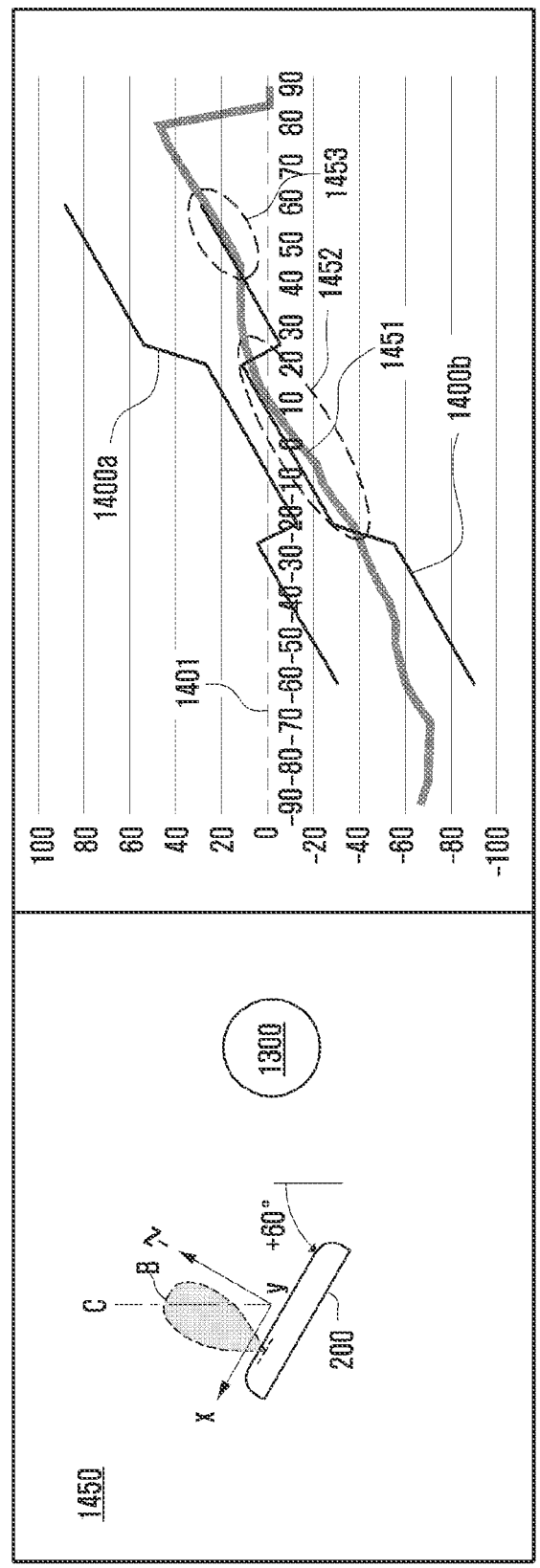

According to a sixth measurement condition 1410 of FIG. 14A, the electronic device 200 may rotate about the central axis C forming an angle of 60 degrees with the x axis in a state tilted by −60 degrees about the y axis. A sixth graph 1411 may represent a value obtained by measuring a first angle at which a signal transmitted from the signal source 1300 is received with respect to the x-axis using the first antenna 410 and the second antenna 420 of FIG. 4 when the electronic device 200 is rotated about the central axis C in the sixth measurement condition 1410. In the graphs of FIGS. 14A, 14B, and 14C, a horizontal axis 1401 may indicate an angle at which the electronic device 200 rotates about the central axis C.

According to a seventh measurement condition 1420 of FIG. 14A, the electronic device 200 may rotate about the central axis C forming an angle of 30 degrees with the x axis when the electronic device 200 is tilted by −30 degrees about the y axis. A seventh graph 1421 may represent a value obtained by measuring a first angle at which a signal transmitted from the signal source 1300 is received with respect to the x-axis using the first antenna 410 and the second antenna 420 of FIG. 4 when the electronic device 200 is rotated about the central axis C in the seventh measurement condition 1420.

According to an eighth measurement condition 1430 of FIG. 14B, the electronic device 200 may rotate about the x-axis while not being tilted about the y-axis. An eighth graph 1431 may represent a value obtained by measuring a first angle at which a signal transmitted from the signal source 1300 is received with respect to the x-axis using the first antenna 410 and the second antenna 420 of FIG. 4 when the electronic device 200 is rotated about the central axis C in the eighth measurement condition 1430.

According to a ninth measurement condition 1440 of FIG. 14B, the electronic device 200 may rotate about the central axis C forming an angle of 30 degrees with the x axis in a state tilted by +30 degrees about the y axis. A ninth graph 1441 may represent a value obtained by measuring a first angle at which a signal transmitted from the signal source 1300 is received with respect to the x-axis using the first antenna 410 and the second antenna 420 of FIG. 4 when the electronic device 200 is rotated about the central axis C in the ninth measurement condition 1440.

According to a tenth measurement condition 1450 of FIG. 14C, the electronic device 200 may rotate about the central axis C forming an angle of 60 degrees with the x-axis in a state tilted by +60 degrees about the y-axis. A tenth graph 1451 may represent a value obtained by measuring a first angle in which a signal transmitted from the signal source 1300 is received with respect to the x-axis using the first antenna 410 and the second antenna 420 of FIG. 4 when the electronic device 200 is rotated about the central axis C in the tenth measurement condition 1450.

Due to a tilted angle of the electronic device 200, a first angle recognized using signals received through the first antenna 410 and the second antenna 420 may vary according to a rotation of the electronic device 200 as in the first graph 1311, the second graph 1321, the third graph 1331, the fourth graph 1341, the fifth graph 1351, the sixth graph 1411, the seventh graph 1421, the eighth graph 1431, the ninth graph 1441, or the tenth graph 1451.

In FIGS. 13A, 13B, 13C, 14A, 14B, and 14C, a graph 1300a and a graph 1300b may represent a design range that can ensure reliability of data received from the signal source 1300 according to a rotation angle of the electronic device 200. As illustrated, a portion 1312 or '1313 in the first graph 1311, a portion 1352 in the fifth graph 1351, a portion 1411 or '1412 in the sixth graph 1411, a portion indicated by 1422 in the seventh graph 1421, and a portion 1452' or 1453 in the tenth graph 1451 may be out of the design range. This may indicate that reliability of the first angle recognized using signals received through the first antenna 410 and the second antenna 420 in the first measurement condition 1310, the fifth measurement condition 1350, the sixth measurement condition 1410, the seventh measurement condition 1420, or the tenth measurement condition 1450 is insecure.

In step 1220 of FIG. 12, the control circuit may determine reliability of the first angle recognized using signals received through the first antenna 410 and the second antenna 420 according to an angle at which the electronic device 200 is tilted. An angle at which the electronic device 200 is tilted about the x-axis may correspond to a second angle recognized using signals received through the first antenna 410 and the third antenna 430 of FIG. 4. When the first antenna 410 and the third antenna 430 are misaligned, an operation for correcting the second angle may be performed (e.g., see step 720 of FIG. 7).

In step 1220 of FIG. 12, when the second angle is not included in a threshold range (e.g., the first measurement condition 1310, the fifth measurement condition 1350, the sixth measurement condition 1410, the seventh measurement condition 1420, or the tenth measurement condition 1450), a first angle recognized using the first antenna 410 and the second antenna 420, and data received from the signal source 1300 may be determined as data in which reliability is insecure to be filtered. Data in which reliability is insecure may not be utilized for a location determination function (e.g., an application related to a location determination function) as invalid data, for example. In step 1220 of FIG. 12, when the second angle is included in a threshold range, the first angle recognized using the first antenna 410 and the second antenna 420, and data received from the signal source 1300 may be determined as data having secured reliability. The data in which reliability is secured may be utilized for a location determination function as valid data, for example. The antenna structure 400 may form directivity capable of transmitting and receiving a wave in the −z axis direction and a beam pattern B related thereto. When the second angle is included in a threshold range, this may indicate a state having a high possibility that a signal may be substantially received through a main beam (or main lobe) of the beam pattern B.

Figure 15:
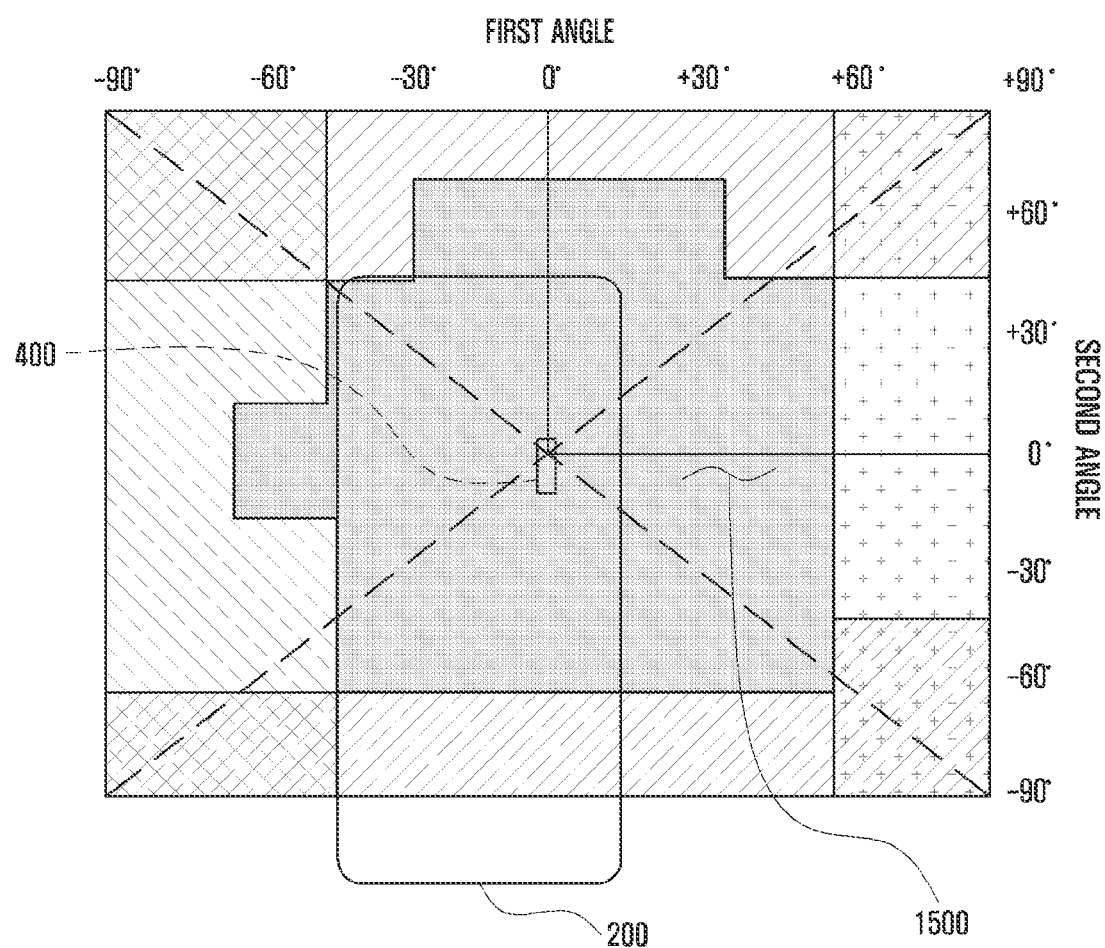

FIG. 15 illustrates a two-dimensional coordinate system perpendicular to a maximum radiation direction of the antenna structure 400, according to an embodiment. Referring to FIG. 15, when a two-dimensional coordinate value including a first angle (e.g., first coordinate value) recognized using the first antenna 410 and the second antenna 420 of FIG. 4 and a second angle (e.g., second coordinate value) recognized using the first antenna 410 and the third antenna 430 of FIG. 4 is positioned in a configured or designated coordinate area 1500 (e.g., a trusted area), data received from the signal source 1300 may be determined as data in which reliability is secured. The trusted area 1500 may be provided based on data measured in various measurement conditions described with reference to FIG. 13A, 13B, 13C, 14A, 14B, or 14C.

As described above, an electronic device may include a plurality of antennas and a control circuit. The control circuit may identify a two-dimensional coordinate value using signals received through the plurality of antennas and correct a signal reception angle based on the two-dimensional coordinate value, or to selectively filter data received from a signal source through the plurality of antennas.

In identifying the two-dimensional coordinated values, the control circuit may be configured to identify a first angle in which a signal is received with respect to an x-axis using a first antenna and a second antenna among the plurality of antennas as a first coordinate value among the two-dimensional coordinate values. In identifying the two-dimensional coordinated values, the control circuit may be configured to identify a second angle in which a signal is received with respect to a y-axis using the first antenna and a third antenna among the plurality of antennas as a second coordinate value among the two-dimensional coordinate values.

The first antenna and the second antenna may be aligned in a direction of the x-axis. The first antenna and the third antenna may be misaligned in the y-axis direction.

In correcting the signal reception angel, the control circuit may be configured to correct the second angle using a misalignment distance of the first antenna and the third antenna, and the first angle.

The first antenna and the second antenna, or the first antenna and the third antenna may be spaced apart by a length of one-half of a wavelength of the signals.

In selectively filtering the data received from the signal source, the control circuit may be configured to filter the data received from the signal source when the two-dimensional coordinate value is not positioned in a configured or designated coordinate area.

At least one among the plurality of antennas may include a patch antenna.

The plurality of antennas may be included in an antenna array.

The plurality of antennas may be positioned at an identical substrate.

The electronic device may further include a housing forming a front surface and a rear surface thereof. The electronic device may further include a display to be positioned inside the housing. The display may be visually exposed through the front surface. The plurality of antennas may form a main beam in a direction in which the rear surface faces.

The electronic device may include a first antenna and a second antenna aligned in an x-axis direction. The electronic device may include a third antenna misaligned with the first antenna in a y-axis direction. The electronic device may include a control circuit configured to identify a first signal reception angle using signals received through the first antenna and the second antenna, identify a second signal reception angle using signals received through the first antenna and the third antenna, and correct the second signal reception angle using a misalignment distance of the first antenna and the third antenna, and the first signal reception angle.

The first antenna, the second antenna, and the third antenna may include a patch antenna.

The plurality of antennas may be positioned at an identical substrate.

The control circuit may be further configured to filter data received from the signal source based on the first signal reception angle and the corrected second signal reception angle.

The control circuit may be further configured to filter data received from the signal source when two-dimensional coordinate values corresponding to the first signal reception angle and the corrected second signal reception angle are not positioned in a configured or designated coordinate area.

As described above, a method of operating an electronic device may include identifying a two-dimensional coordinate value using signals received through a plurality of antennas, and correcting a signal reception angle based on the two-dimensional coordinate value or selectively filtering data received from a signal source.

Identifying the two-dimensional coordinate value using signals received through the plurality of antennas may include identifying a first angle in which a signal is received with respect to an x-axis using a first antenna and a second antenna among the plurality of antennas as a first coordinate value among the two-dimensional coordinate values. Identifying a two-dimensional coordinate value using signals received through a plurality of antennas may include identifying a second angle in which a signal is received with respect to a y-axis using the first antenna and the third antenna among the plurality of antennas as a second coordinate value among the two-dimensional coordinate values.

The first antenna and the second antenna may be aligned in a direction of the x-axis. The first antenna and the third antenna may be misaligned in a direction of the y-axis.

Correcting a signal reception angle based on the two-dimensional coordinate value may include correcting the second angle using a misalignment distance of the first antenna and the third antenna, and the first angle.

Selectively filtering data received from a signal source may include filtering the data received from the signal source when the two-dimensional coordinate value is not positioned in a configured or designated coordinate area.

The embodiments of the disclosure disclosed in this specification and drawings only present a specific example in order to easily describe the technical contents according to an embodiment of the disclosure and to help an understanding of the embodiments of the disclosure, and they do not intend to limit the scope of the embodiments of the disclosure. Therefore, changes or modifications in addition to the embodiments disclosed herein should be construed as being included in the scope of embodiments of the disclosure.

While the present disclosure has been described with reference to various embodiments, various changes may be made without departing from the spirit and the scope of the present disclosure, which is defined, not by the detailed description and embodiments, but by the appended claims and their equivalents.

What is claimed is:

1. An electronic device comprising:
a plurality of antennas configured to receive signals from a signal source; and
a control circuit configured to:
determine, from a phase difference between signals received through a first antenna and a second antenna among the plurality of antennas, a first reception angle with respect to an x-axis of the electronic device,
determine, from a phase difference between signals received through the first antenna and a third antenna among the plurality of antennas, a second reception angle with respect to a y-axis of the electronic device, and
filter the signals received from the signal source through the plurality of antennas according to the first signal reception angle and the second signal reception angle,
wherein the first antenna and the second antenna are aligned in a first direction parallel to the x-axis,
wherein the first antenna and the third antenna are misaligned in a second direction parallel to the y-axis such that a misalignment distance in the first direction between the first antenna and the third antenna is formed, and
wherein the control circuit is further configured to correct the second signal reception angle based on the first signal reception angle and the misalignment distance.

2. The electronic device of claim 1,
wherein the first antenna and the second antenna, or the first antenna and the third antenna are spaced apart by a length of one-half of a wavelength of the signals.

3. The electronic device of claim 1,
wherein, in filtering the signals received from the signal source through the plurality of antennas according to the first signal reception angle and the second signal reception angle, the control circuit is configured to:
generate a two-dimensional coordinate value comprising an x-coordinate value corresponding to the first signal reception angle and a y-coordinate value corresponding to the second signal reception angle, the two-dimensional coordinate value indicating a relative position of the signal source with respect to the electronic device, and
filter the signals received from the signal source when the two-dimensional coordinate value is not included in a designated coordinate value range.

4. The electronic device of claim 1,
wherein at least one among the plurality of antennas comprises a patch antenna.

5. The electronic device of claim 1,
wherein the plurality of antennas are included in an antenna array.

6. The electronic device of claim 1,
wherein the plurality of antennas are positioned at an identical substrate.

7. The electronic device of claim 1, further comprising:
a housing configured to form a front surface of the electronic device and a rear surface of the electronic device; and
a display positioned inside the housing and visually exposed through the front surface,
wherein the plurality of antennas are configured to form a main beam in a direction in which the rear surface faces.

8. An electronic device, comprising:
a first antenna and a second antenna aligned in a first direction parallel to an x-axis of the electronic device;
a third antenna misaligned with the first antenna in a second direction parallel to a y-axis of the electronic device such that a misalignment distance in the first direction between the first antenna and the third antenna is formed; and a control circuit, wherein the control circuit is configured to:

determine a first signal reception angle from a phase difference between signals received from a signal source through the first antenna and the second antenna, determine a second signal reception angle from a phase difference between signals received from the signal source through the first antenna and the third antenna, and correct the second signal reception angle based on the first signal reception angle and the misalignment distance.

9. The electronic device of claim 8,
wherein the first antenna, the second antenna, and the third antenna comprise a patch antenna.

10. The electronic device of claim 8,
wherein the first antenna, the second antenna, and the third antenna are positioned at an identical substrate.

11. The electronic device of claim 8,
wherein the control circuit is further configured to filter signals received from the signal source based on the first signal reception angle and the corrected second signal reception angle.

12. The electronic device of claim 11, wherein the control circuit is further configured to:

generate a two-dimensional coordinate value comprising an x-coordinate value corresponding to the first signal reception angle and a y-coordinate value corresponding to the second signal reception angle, the two-dimensional coordinate value indicating a relative position of the signal source with respect to the electronic device, and filter the signals received from the signal source when the two-dimensional coordinate value is not included in a designated coordinate value range.

13. A method of operating an electronic device, the method comprising:

determining, from a phase difference between signals received through a first antenna and a second antenna, a first reception angle with respect to an x-axis of the electronic device;

determining, from a phase difference between signals received through the first antenna and a third antenna, a second reception angle with respect to a y-axis of the electronic device; and filtering signals received from a signal source through the plurality of antennas according to the first signal reception angle and the second signal reception angle, wherein the first antenna and the second antenna are aligned in a first direction parallel to the x-axis, wherein the first antenna and the third antenna are misaligned in a second direction parallel to the y-axis such that a misalignment distance in the first direction between the first antenna and the third antenna is formed, and wherein the method further comprises correcting the second signal reception angle based on the first signal reception angle and the misalignment distance.

14. The method of claim 13,
wherein filtering the signals received from the signal source through the plurality of antennas according to the first signal reception angle and the second signal reception angle comprises:

generating a two-dimensional coordinate value comprising an x-coordinate value corresponding to the first signal reception angle and a y-coordinate value corresponding to the second signal reception angle, the two-dimensional coordinate value indicating a relative position of the signal source with respect to the electronic device, and filtering the signals received from the signal source when the two-dimensional coordinate value is not included in a designated coordinate value range.

\* \* \* \* \*